(12) United States Patent
Laval et al.

(10) Patent No.: US 9,021,431 B2
(45) Date of Patent: Apr. 28, 2015

(54) SYSTEM AND METHOD FOR DEVELOPING, DEPLOYING AND IMPLEMENTING POWER SYSTEM COMPUTER APPLICATIONS

(71) Applicants: Stuart S. Laval, Fort Mill, SC (US); David C. Lawrence, Raleigh, NC (US); Khoi Nguyen, Sanford, FL (US); Wei Huang, Oveido, FL (US); Douglas A. Voda, Sanford, FL (US)

(72) Inventors: Stuart S. Laval, Fort Mill, SC (US); David C. Lawrence, Raleigh, NC (US); Khoi Nguyen, Sanford, FL (US); Wei Huang, Oveido, FL (US); Douglas A. Voda, Sanford, FL (US)

(73) Assignee: ABB Inc., Cary, NC (US)

( * ) Notice: Subject to any disclaimer, the term of this patent is extended or adjusted under 35 U.S.C. 154(b) by 26 days.

(21) Appl. No.: 13/735,920

(22) Filed: Jan. 7, 2013

(65) Prior Publication Data

US 2014/0195844 A1 Jul. 10, 2014

(51) Int. Cl.
| | | |
|---|---|---|
| G06F 11/30 | (2006.01) | |
| G06F 15/16 | (2006.01) | |
| G06F 17/00 | (2006.01) | |
| G06F 9/44 | (2006.01) | |
| G06F 9/445 | (2006.01) | |

(52) U.S. Cl.
CPC .............. *G06F 11/3062* (2013.01); *G06F 8/34* (2013.01); *G06F 8/61* (2013.01)

(58) Field of Classification Search
None
See application file for complete search history.

(56) References Cited

U.S. PATENT DOCUMENTS

| 4,408,155 | A | 10/1983 | McBride |
|---|---|---|---|
| 4,539,520 | A | 9/1985 | McBride |
| 5,497,096 | A | 3/1996 | Banting |
| 5,550,476 | A | 8/1996 | Lau et al. |
| 5,656,931 | A | 8/1997 | Lau et al. |
| 6,088,706 | A | 7/2000 | Hild |
| 6,104,352 | A | 8/2000 | Jones |
| 6,172,647 | B1 | 1/2001 | Jones |
| 7,072,886 | B2 | 7/2006 | Salmenkaita et al. |
| 7,392,143 | B2 * | 6/2008 | Jayabalan et al. ............. 702/60 |
| 7,409,394 | B2 | 8/2008 | Lee |
| 7,492,255 | B1 | 2/2009 | Morris |
| 7,555,287 | B1 | 6/2009 | Heinonen et al. |
| 7,719,436 | B2 | 5/2010 | Feight |
| 7,848,897 | B2 * | 12/2010 | Williams, Jr. .................. 702/60 |
| 7,881,762 | B2 | 2/2011 | Kling et al. |
| 7,911,746 | B2 | 3/2011 | Zaretsky et al. |
| 7,930,141 | B2 | 4/2011 | Banting |
| 8,039,978 | B2 * | 10/2011 | Gillett ............................. 290/44 |
| 8,248,203 | B2 * | 8/2012 | Hanwright et al. .......... 340/3.44 |
| 8,254,090 | B2 * | 8/2012 | Prax et al. ..................... 361/641 |
| 8,255,090 | B2 * | 8/2012 | Frader-Thompson et al. ............................. 700/295 |
| 8,261,231 | B1 * | 9/2012 | Hirsch et al. .................. 717/100 |
| 8,423,242 | B2 * | 4/2013 | Ochiai et al. .................... 701/36 |
| 8,509,923 | B2 * | 8/2013 | Koskan et al. .................. 700/22 |
| 2013/0024542 | A1 * | 1/2013 | Keller et al. .................. 709/217 |
| 2014/0004829 | A1 * | 1/2014 | Rieger et al. .................. 455/411 |

FOREIGN PATENT DOCUMENTS

| CH | WO-2013182442 | * 6/2013 | ................... 717/100 |
|---|---|---|---|

* cited by examiner

*Primary Examiner* — Don Wong
*Assistant Examiner* — Devayani R Talukdar
(74) *Attorney, Agent, or Firm* — Melissa J. Szczepanik

(57) ABSTRACT

A system and method for developing, deploying and implementing computer applications for a power system has an open software framework for developing mobile applications. The mobile applications are developed by combining predefined modules having functionality to monitor a power system, change configuration settings within devices installed on the power system and allow utility personnel to quickly respond to events occurring on the power system.

19 Claims, 31 Drawing Sheets

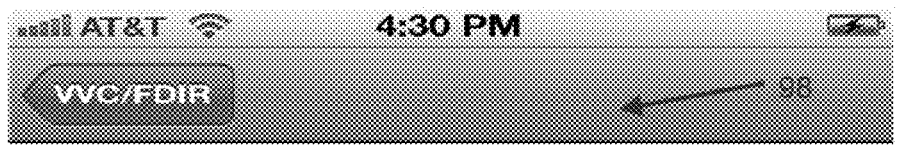
Lake Mary
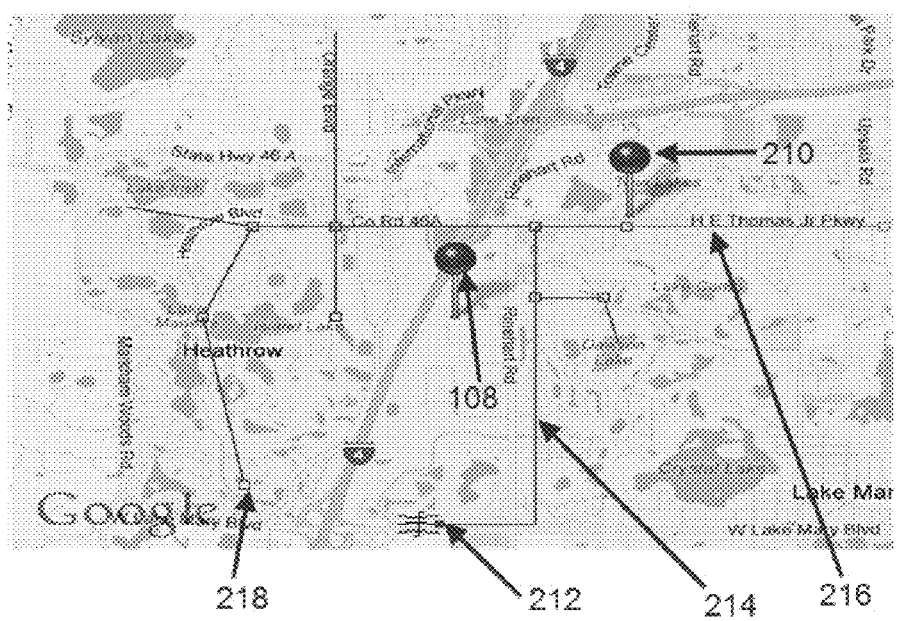
FIG. 33

SYSTEM AND METHOD FOR DEVELOPING, DEPLOYING AND IMPLEMENTING POWER SYSTEM COMPUTER APPLICATIONS

FIELD OF INVENTION

The present application is directed to a framework for developing mobile applications for the power industry and mobile applications developed, deployed, and implemented using the framework.

BACKGROUND

Developers of computer applications for power systems are often tasked with creating programs to monitor the system and expedite the restoration of power in the event of a fault. The computer applications must also keep energy efficiency and conservation in mind. When coding new programs, developers often find themselves creating the basic framework of the applications repeatedly for each new program.

The computer applications developed for utility companies that monitor power distribution network status are geared toward preventing fault events and quickly restoring power when fault events do occur in order to prevent interruption of service to power consumers. However, even with the use of existing computer applications, it is often difficult for power service technicians to pinpoint the exact location of the fault or equipment in need of service without traveling to or communicating with the utility's network control center (NCC).

The NCC typically has several large screens showing real-time single line diagrams of the network status. Single line diagrams show elements on the network such as source, load, and devices such as transformers, circuit breakers, switchgear, re-closers, switches, and sensors. In the event that devices on the distribution network require servicing or maintenance, the NCC will generate a service ticket and dispatch the ticket to the appropriate utility personnel.

When utility personnel are performing maintenance in a location remote from the NCC, utility personnel contact the NCC to determine whether the devices are offline, energized, or require maintenance. Additionally, utility personnel call the control room to deactivate the devices prior to performing maintenance or activate the devices once the maintenance has been completed. Utility personnel are not alerted automatically or directly of the status or location of devices requiring service on the network.

Another difficulty that utility companies face is frequent replacement of equipment such as fault current indicators (FCIs) and other sensors on the grid in response to changing predicted or actual load profile values, environmental conditions, and neighboring devices on the electrical grid. To remedy the aforementioned problems, existing equipment having un-modifiable parameters is often replaced with new equipment that has the desired, but also un-modifiable, parameters.

SUMMARY

A framework for developing a computer application for monitoring an operational status of a power system has a set of modules combinable to build said computer application and is installed on a mobile device. Each of the modules has an associated functionality selected from at least one of the following functions: security management, profile management, system configuration, device level views, event views, data access, background service, mapping/GIS, data service, and application programming interfaces, each of the modules are combinable with another of the modules to develop the computer application for monitoring the operational status of the power system.

A computer application for effecting the operation of a sensor installed on a power distribution system accesses operational data of the sensor from a gateway server collecting and storing data for at least one substation. The operational data of the sensor is accessed using an identification number representing the sensor. The computer application is installed on a mobile device having bi-directional communication with a gateway server and the computer application is capable of receiving configuration input to effect operational values of the sensor. The mobile device transmits received configuration input to the gateway server and the gateway server updates configuration of the sensor.

A computer application for monitoring the status of a device installed on a power distribution system is installed on a mobile device in bi-directional communication with a gateway server. The mobile device requests data from the gateway server and the gateway server transmits the requested data to the computer application installed on the mobile device. The computer application prepares the data for presentation and the data presentation indicates the status of the power distribution system device being monitored.

BRIEF DESCRIPTION OF THE DRAWINGS

In the accompanying drawings, structural embodiments are illustrated that, together with the detailed description provided below, describe exemplary embodiments of a framework for developing, deploying and implementing power system computer applications. One of ordinary skill in the art will appreciate that a component may be designed as multiple components or that multiple components may be designed as a single component.

Further, in the accompanying drawings and description that follow, like parts are indicated throughout the drawings and written description with the same reference numerals, respectively. The figures are not drawn to scale and the proportions of certain parts have been exaggerated for convenience of illustration.

FIG. 5b is a continuation of the diagram of FIG. 5a;

FIG. 6b is a continuation of the diagram of FIG. 6a;

FIG. 33 shows the mapping functionality in more detail, such as the status of equipment and devices on the map and the spatial relation between device locations.

DETAILED DESCRIPTION

Figure 1:
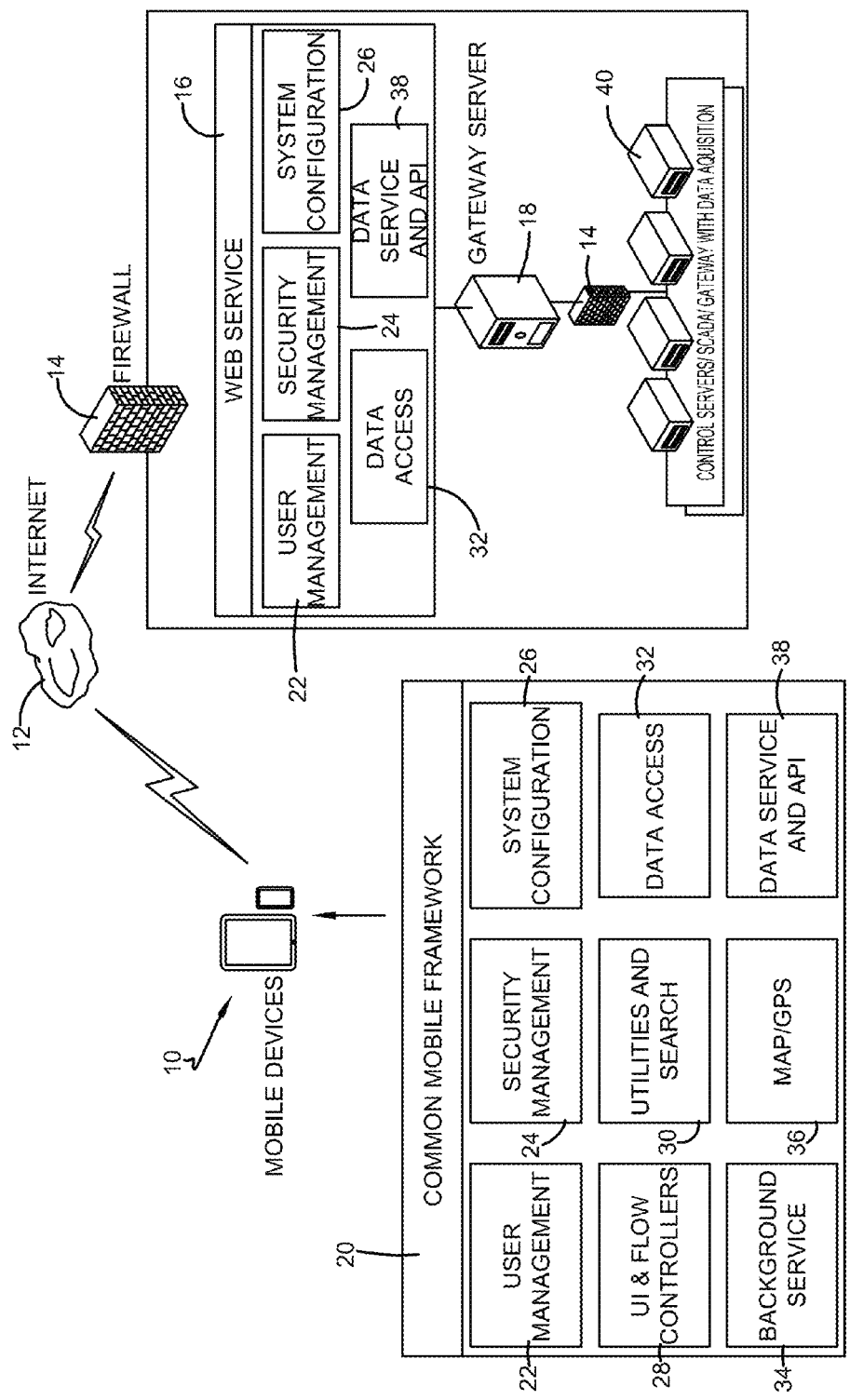
FIG. 1 shows the system architecture of an open software framework embodied in accordance with the present invention, and further showing the open software framework having modules that are present on both client and server sides of the system.

With reference to FIG. 1, a mobile device 10 having a computer application 100 installed thereon is depicted. The mobile device 10 is embodied as an iPhone, Smartphone, tablet, e-reader, digital camera, cell phone, laptop, netbook, personal digital assistant (PDA), iPod Touch or custom electronic device capable of carrying out the present invention. Alternatively, the mobile device 10 may be embodied as a navigation system or another computer system in a vehicle.

In the exemplary embodiment depicted in FIG. 1, the mobile device 10 is a smartphone having a mobile application or "mobile app" installed thereon. The mobile device 10 has an operating system such as iOS, Windows, Android, webOS, Symbian or another operating system capable of carrying out the functionality of the computer application 100 installed thereon. An open software framework 20 is used to create, deploy and implement the computer application 100 and has modules 22, 24, 26, 28, 32, 34, 36, 38 that are written in C#, JAVA, Objective-C or another programming language supported by the operating system of the device 10.

Open Software Framework for Power System Mobile Applications

The open software framework 20 runs on a Windows operating system or another operating system capable of carrying out the invention. The open software framework 20 is installed on a pc, server, laptop, tablet or another machine that executes computer-readable program code. The open software framework 20 provides a user with the tools to build a computer application 100 without having knowledge or experience in writing computer code. Additionally, the open software framework 20 provides reusable templates for creating applications so that developers don't have to focus on smaller issues that have already been solved by other developers.

The open software framework 20 provides generic templates for the creation of new computer applications 100 for a wide range of business purposes in the power industry. Users can develop the computer application 100 by configuring the functionality desired within the open software framework 20, enabling a pre-built human machine interface (HMI) and providing the identity and location of the data source to the computer application 100 or web service 16.

In one embodiment, the open software framework 20 allows for point, click, drag, and drop of icons, each icon representing a module 22, 24, 26, 28, 32, 34, 36, 38, software component, or sub-component used to build the computer application 100 in conjunction with one or more other modules 22, 24, 26, 28, 32, 34, 36, 38. The completed computer applications 100 are downloaded from the internet, web service, or mobile application store such as Apple Inc.'s App Store™, Android's Market or another application distribution platform to the device or otherwise transferred to the mobile device 10 using a CD-ROM, memory card, memory stick or another medium.

The open software framework 20 is present on the both the client and server sides of the system architecture as depicted in FIG. 1. The client side includes but is not limited to the mobile device 10 that executes the computer application 100 built using the open software framework 20. The server side has a web service 16 or portal that delivers modules 22, 24, 26, 28, 32, 34, 36, 38 of the open software framework 20 that are accessible by client programs such as the computer application 100 installed on the mobile device 10.

Figure 2:
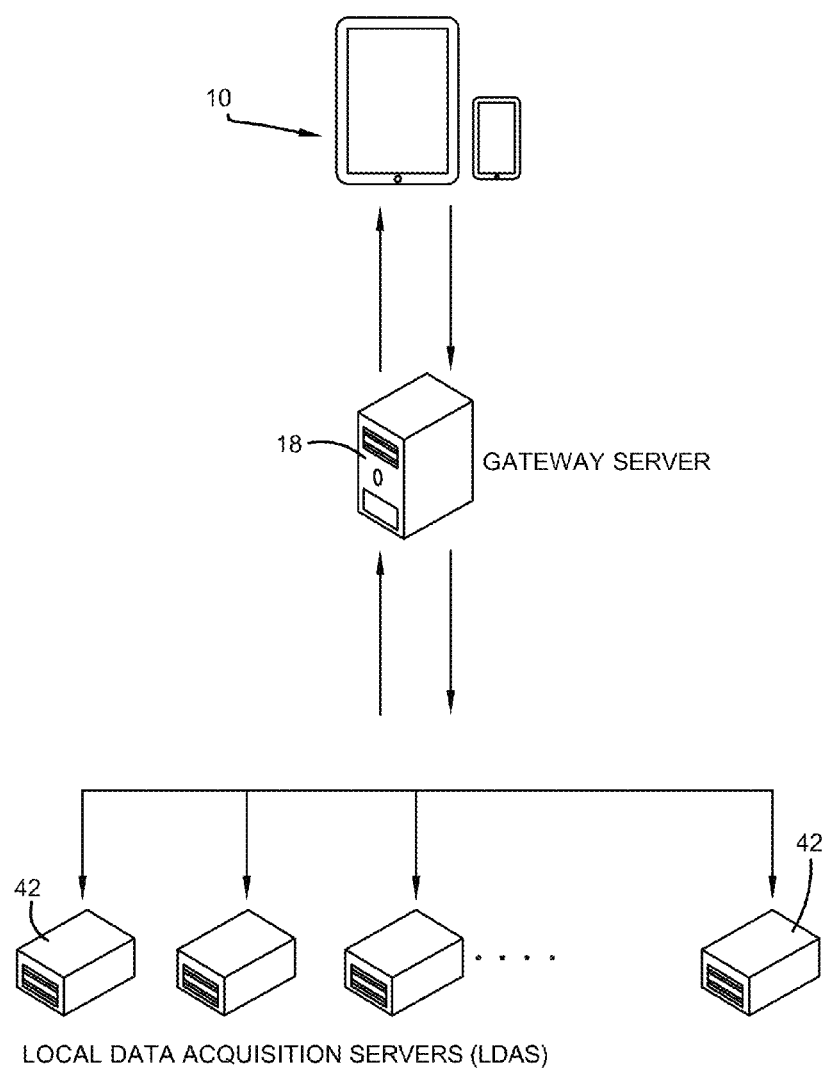
FIG. 2 shows the communication between the gateway servers, local data acquisition servers and mobile devices.

The system architecture for the open software framework 20 is shown in FIGS. 1 and 2. The mobile devices 10 connect to a web service 16 through the internet 12. The web service 12 validates and authenticates the mobile device 10 for further access to the gateway server 18 in order to further retrieve data from local data acquisition servers (LDAS) 40 in communication with the gateway server 18. There may be a firewall 14 that restricts access to the LDAS 40 and the web service 16, respectively, from outside intrusions.

The gateway server 18 receives requests from the computer application 100, retrieves data from online databases in the web service 16, and sends the retrieved data back to the mobile device 10. The web server 16 pushes alarm notifications to the mobile device 10 when the retrieved data from the web service 16 is outside of a predetermined threshold set by a user in configuration settings of one of the modules 22, 24, 26, 28, 32, 34, 36, 38.

The modules 22, 24, 26, 28, 32, 34, 36, 38 delivered by the open software framework 20 that can be combined to produce a mobile application include but are not limited to user management 22, security management 24, system configuration 26, UI & Flow Controllers 28, Utilities and Search 30, data access 32, background service 34, Map/GIS 36, and Data Service and API 38.

The user management module 22 provides for the creation and maintenance of user profiles. User profiles include the name and location of the user, the user's machine name and/or IP address, and preferences for the graphical user interface (GUI) of the application built from or running on the open software framework 20. User profiles may include role-based security profiles. The roles may include sets of functionality or transactions a user is permitted to access once logged into the computer application 100.

The security management module 24 controls user authentication, user access levels, and message/transport encryptions. The user authentication portion of the security management module 24 controls user access to the computer application 100 built using the open software framework 20. The user access levels of the security management modules are role-based sets of transactions that can be carried out by a user having a particular role or roles assigned to their profile.

The security management module 24 allows for configuration of message and transport encryption for obfuscation of the communications between the local data acquisition servers (LDAS), gateway server 18 and the web service 16 as well as between the mobile devices 10 and the web service 16. The gateway server 16 is responsible for collecting data from LDAS 42 located in multiple remote substations.

The LDAS 42 are embodied as one or more servers located at the substation level that feed or otherwise provide data to a data repository on the gateway server. The LDAS establishes communication with the gateway server by registering with the gateway server. The LDAS 42 is operable to discover the network of connected devices such as Intelligent Electronic Devices (IEDs) and FCIs.

The LDAS 42 discovers the network of connected devices by broadcasting a "Client Discovery Message" to all client devices within a predetermined and configured internet protocol (IP) address range. Upon receiving the message, the client device responds with a "Client Description Message" that includes a brief description of the client's services, location and IP address.

Figure 3:
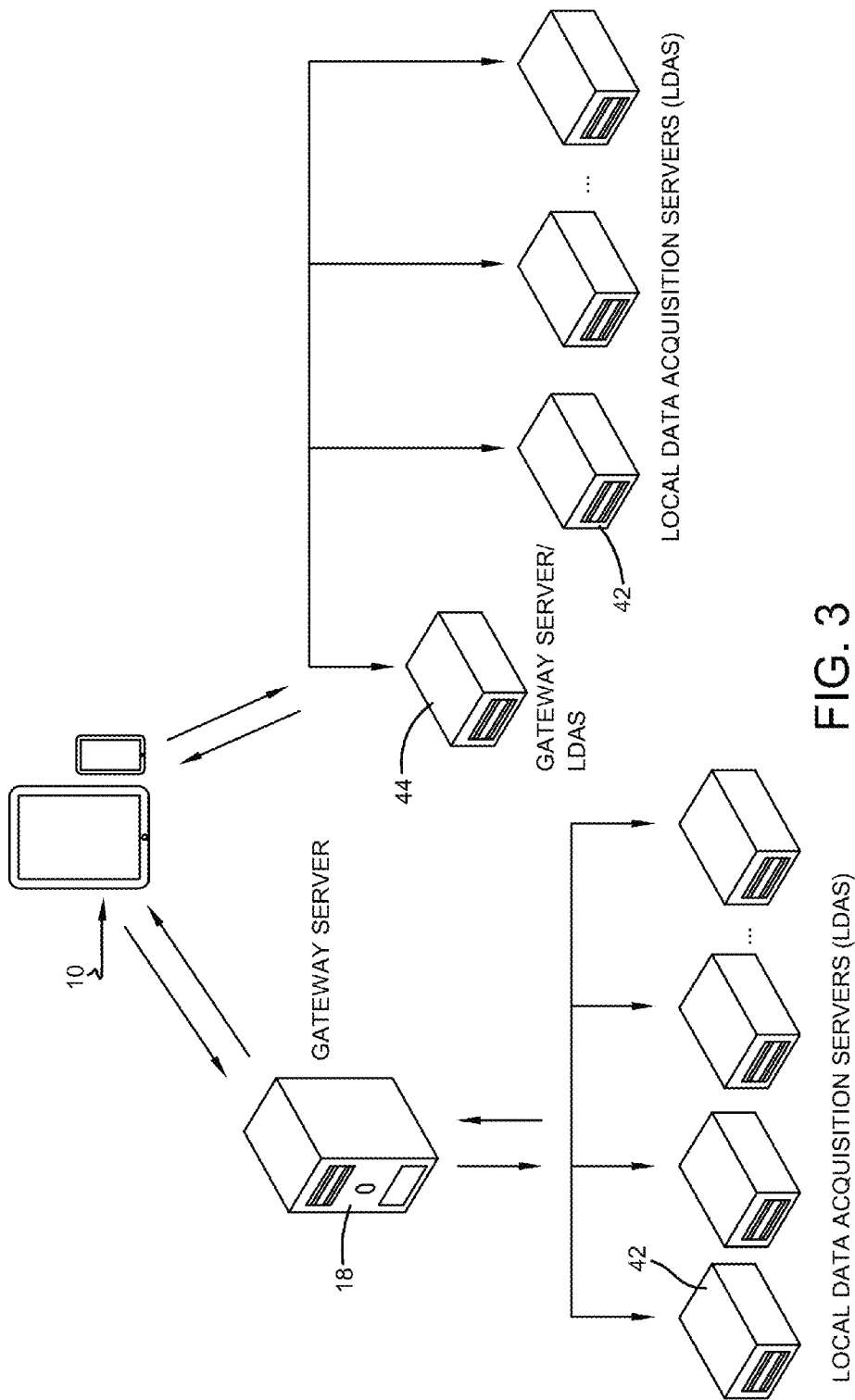
FIG. 3 is an example of a combined server having both LDAS and gateway servers.

Referring now to FIG. 3, the gateway server 18 is combined with the LDAS 42 to provide an integrated gateway/LDAS server 44. The integrated gateway/LDAS server 44 provides a flexible and scalable network topology. The LDAS 42 may be embodied as a supervisory control and data acquisition (SCADA) system server. The SCADA system is often located remotely from the substation 100 and provides supervisory control functions for a plurality of substations and/or other components of the power distribution network.

At the request of a user of the mobile device 10 having the computer application 100 installed thereon, the computer application 100 requests and receives data from the LDAS 42, SCADA or control severs through one or more gateways 18 such as substation servers or wireless provider servers. The retrieved data is displayed on the user's mobile device 10 in numerical, graphical or various other display formats.

The system configuration module 26 of the open software framework 20 provides an interface for maintenance of system settings, user preferences, background service configuration, and framework update and revision management. Updates to the open software framework 20 are operable to be pushed to the mobile devices 10 having computer applications 100 utilizing the system configuration module 26 of the open software framework 20.

The user interface (UI) and flow controller module 28 provides a hierarchical view of the overall power distribution network or electrical grid (hereinafter "grid") and a substation view for individual substations on the grid. The UI and flow controller module 28 has abstract and specific device level views for accessing information about the intelligent electronic devices (IEDs), sensors, and other equipment on the grid. In that same embodiment, the logical, sub-system and detail views are available. Additionally, a viewer for historical data, charting, and determining trends in the data is available in the UI and flow controller module 28.

The UI and flow controller module 28 provides an event view of fault events, sub-optimal performance of a portion of the grid, and a log view having time- and date-stamped records of the occurrence of the events or measurements taken from portions of the grid or equipment/sensors located thereon. Further, the UI and flow controller module 28 provides a single line diagram generator and viewer. The single line diagram is a presented by a GUI that depicts process objects of the substation as graphical symbols. The single line diagram is updated through HMIs of substation systems such as SCADA and other control systems. The single line diagram may be updated by a user of the HMI or by another computer system in communication with the mobile application 100.

The UI and flow controller module 28 has waveform capture functionality that charts electrical waveforms such as the magnitude of current or voltage over a predetermined time frame for the grid or a section of the grid. The UI and flow controller module 28 allows the user to select data points of interest for further analysis. Additionally, the UI and flow controller module 28 has power system network discovery functionality that automatically detects IEDs, sensors and other equipment on the grid through a connection with the gateway server 18 and/or LDAS 40.

The utility and search module 30 provides data conversion and formatting when data from a data source such as an LDAS 40 are not formatted properly for access, retrieval, or reporting by the computer application 100. Additionally, the utility and search module 30 formats data for storage in data structures of the computer application 100, web service 16, gateway server 18 or LDAS 40.

The data access module 32 provides web service 16 and database access for administrators of the system as well as designated users of the computer application 100.

The background service module 34 is used for data polling of the IEDs and other equipment on the grid and subsequent updating of the data accessible by the computer application 10 from the LDAS 40. The background service module 34 supports the creation and scheduling of batch jobs that retrieve and/or update data on an ad hoc, periodic, or otherwise-specified basis. In the case of data retrieval for reporting purposes, the data is retrieved and stored in user-specified arrangements for report generation on the mobile device 10 from data structures stored on the gateway server 18. Data stored in data structures on the gateway server 18 may also be accessible through a human machine interface (HMI).

The Map/GIS module 36 provides hierarchical location details for substations, IEDs, sensors, and other equipment on the power system network of interest. The Map functionality utilizes the well-known global positioning system (GPS) and a (GIS). The GIS portion of the Map/GIS module 36 correlates the substations and devices to other substations and devices on the grid in a spatial manner. The correlation between substations and equipment on the network provides information, by way of non-limiting example, such as the distance between the equipment and substation of interest or the direction to proceed from the substation in order to locate the equipment of interest.

More particularly, the Map/GIS module 36 conveys to a user that equipment such as a distribution transformer is located a specific number of degrees latitude/longitude (and direction) in relation to an IED of interest, for example. Further, the Map/GIS module 36 determines the user's location (if the mobile device 10 is enabled to detect the user's location), the location on the grid or the location of equipment of interest, and provides driving directions from the user's location to the target location of interest. The target location may be a section of a power distribution line on the grid or a device of interest.

The API module 38 provides a set of reusable application programming interfaces (APIs) that are accessible via the computer applications 100 installed on the devices 10 for retrieving data or performing control commands. The APIs provided by the API module 38 are independent of a particular programming language.

Figure 4:
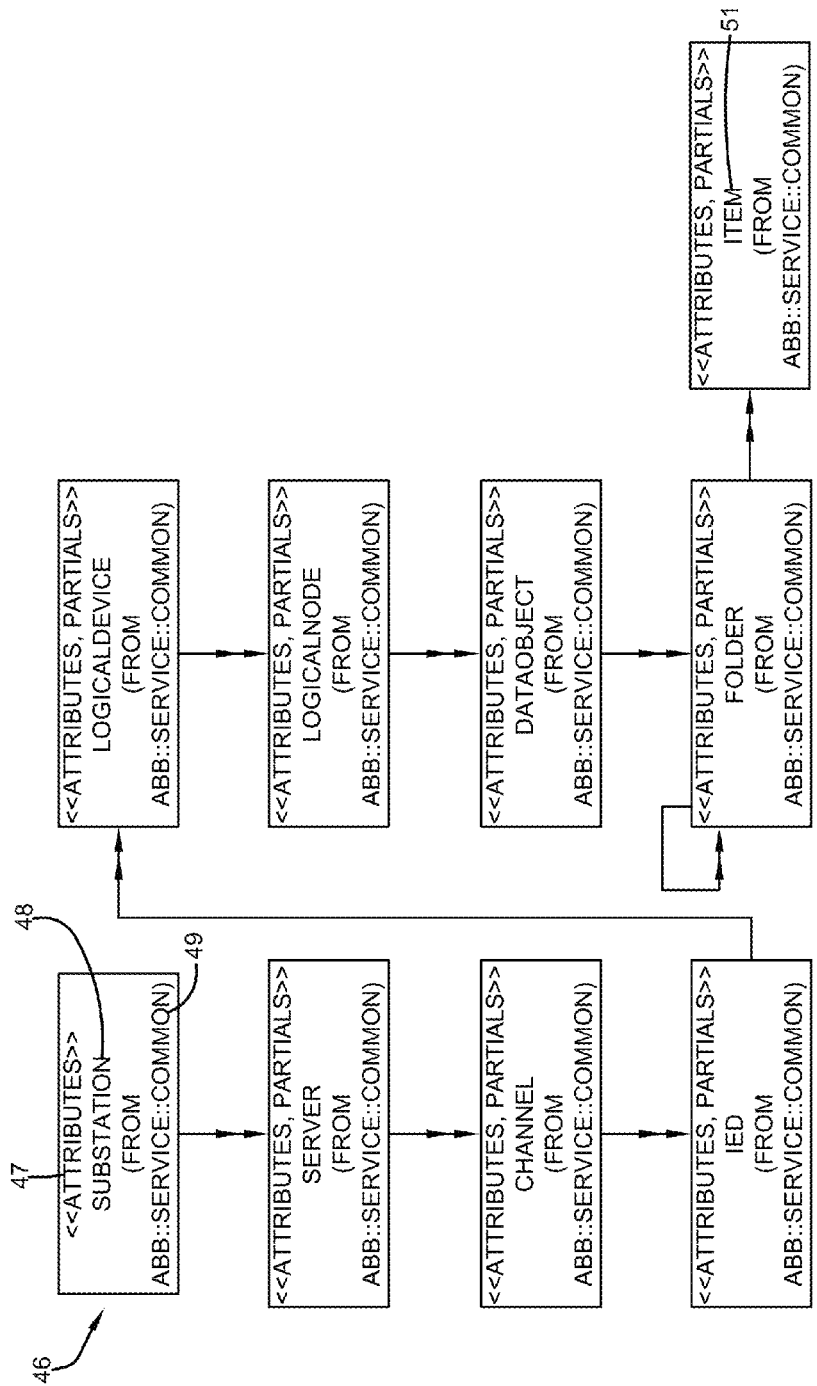
FIG. 4 is high level class diagram of the data object structure of the open software framework.

Referring now to FIG. 4, a high level class diagram 46 describing the data models and structures for the clients such as the devices 10 and servers 18, 40 is shown. The object structure 47 organizes data in a hierarchy, from the substation 48 at a higher level down to the data element 51 that is provided by request or on a scheduled basis to the computer application 100 of the mobile device 10. The object structure 47 provides a framework for the gateway server 18 to arrange and convert the data retrieved from the LDAS 40 into a format that the computer application 100 can interpret.

The exemplary embodiment of a hierarchical class diagram 46 shown in FIG. 4 has the substation 48 at the top of the hierarchy, a second level server which is a particular LDAS (embodied as a SCADA server, control server or gateway with data acquisition server), a third level channel, a fourth level IED, a fifth level logical device, a sixth level logical node, a seventh level data object and an eighth level item 51, the item level 51 being the lowest in the hierarchy. The item level 51 provides the data requested by the computer application 100. It should be understood that other data structures and hierarchies utilizing header and item level 51 data may be utilized to carry out the present invention.

Figure 5A:
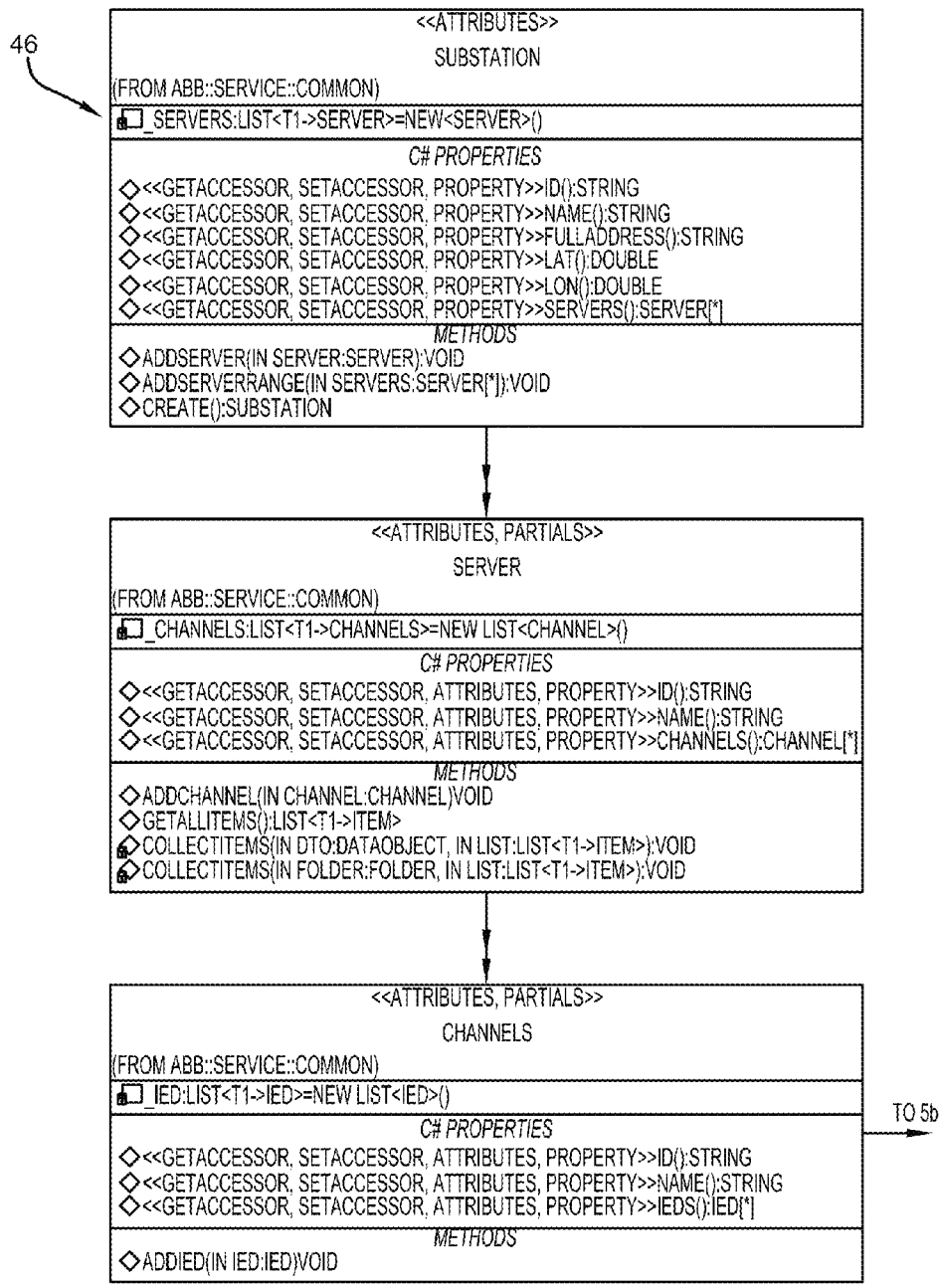
FIG. 5a is a detailed item level class diagram of the data object structure of the open software framework.
Figure 5B:
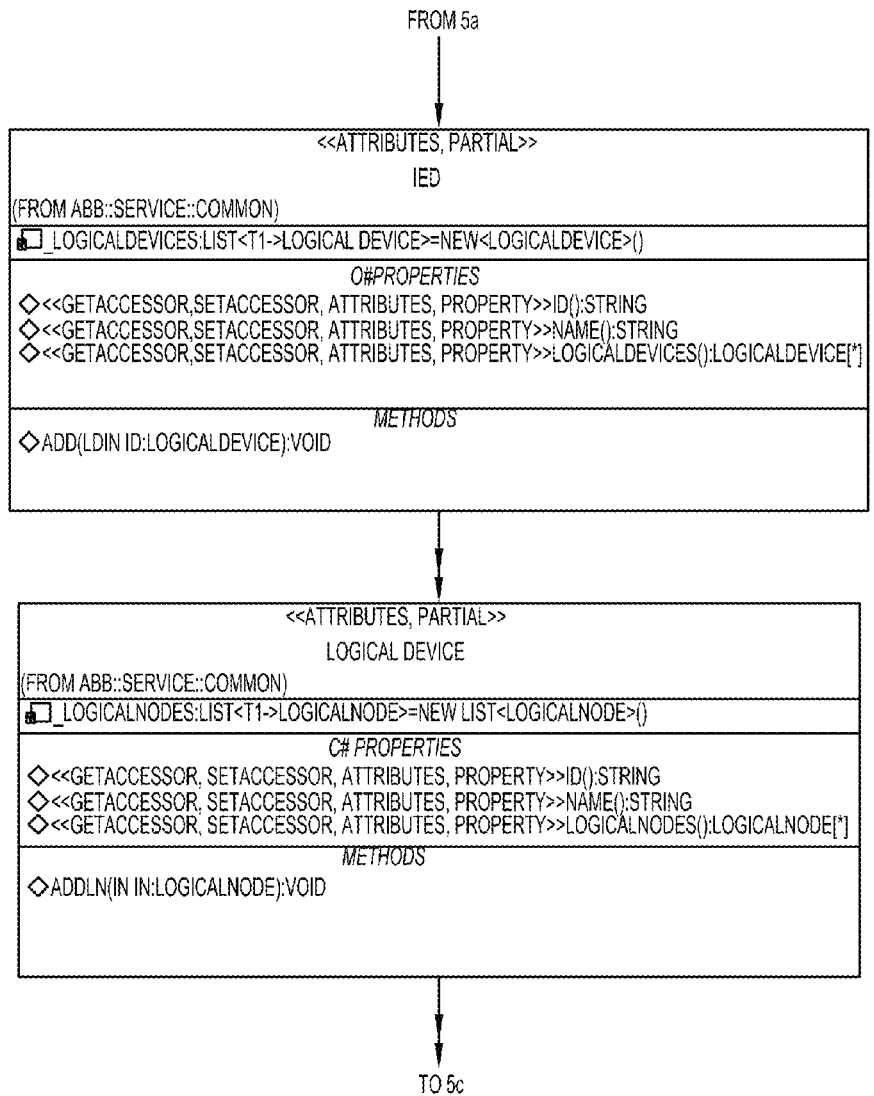
Figure 5C:
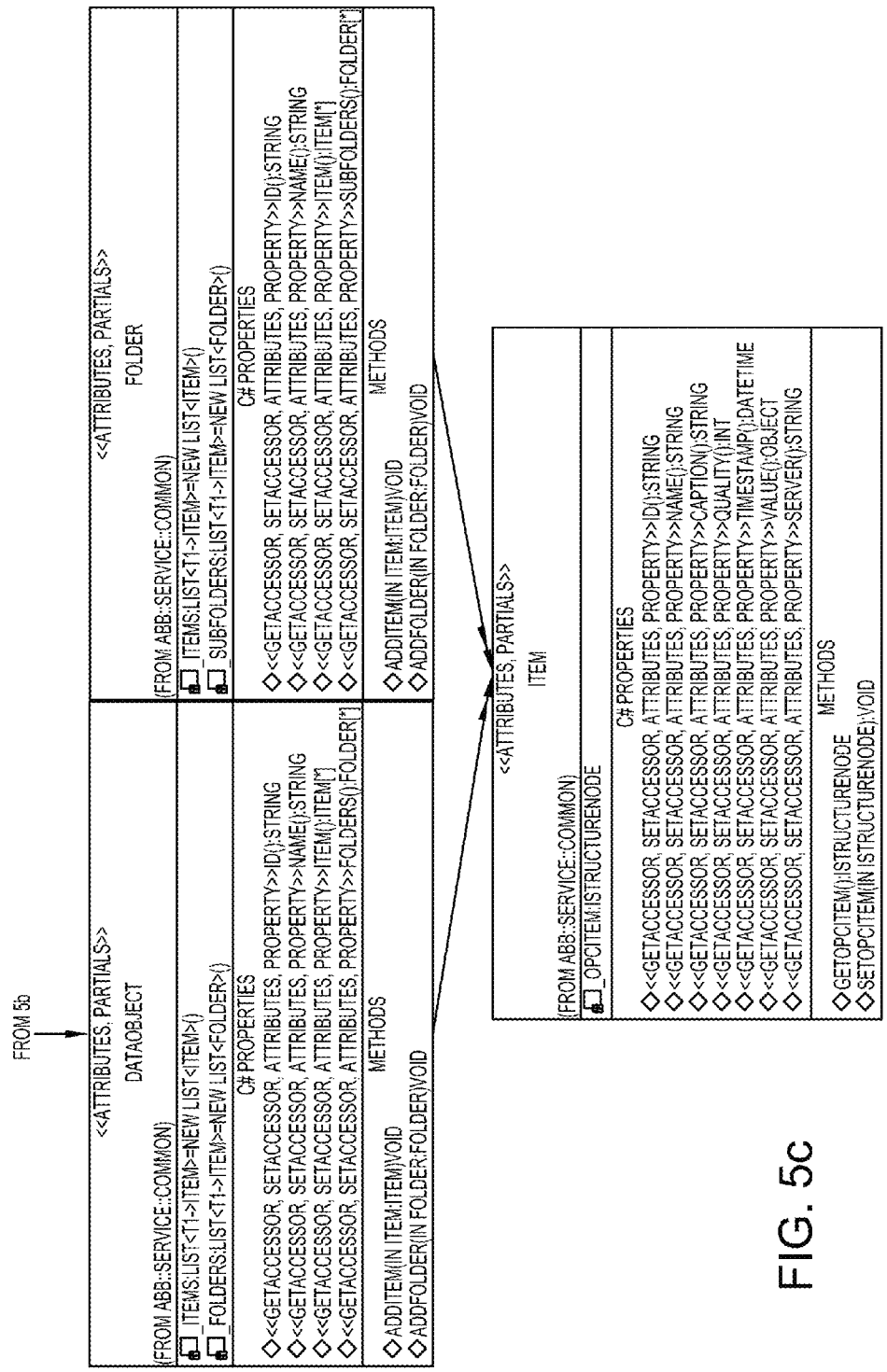
FIG. 5c is a continuation of the diagram of FIGS. 5a and 5b.

Referring now to FIGS. 5*a*-5*c* a detail class diagram 46 comprised of computer code, tags, methods, attributes and properties is shown. The detailed class diagram 46 has a hierarchy starting with the substation level 48 at the highest or header level and continuing down through the hierarchy described above to the list/table views containing detailed data items 51. The item level 51 data is provided as a data record or set of data records having item measurement values or status values along with updated time- and date-stamps, and other related data item attributes as can be seen in FIG. 5*c*. It should be understood that the example hierarchies presented in FIGS. 4-5*c* are presented by way of non-limiting example and that other hierarchies for carrying out the invention are contemplated.

Figure 6A:
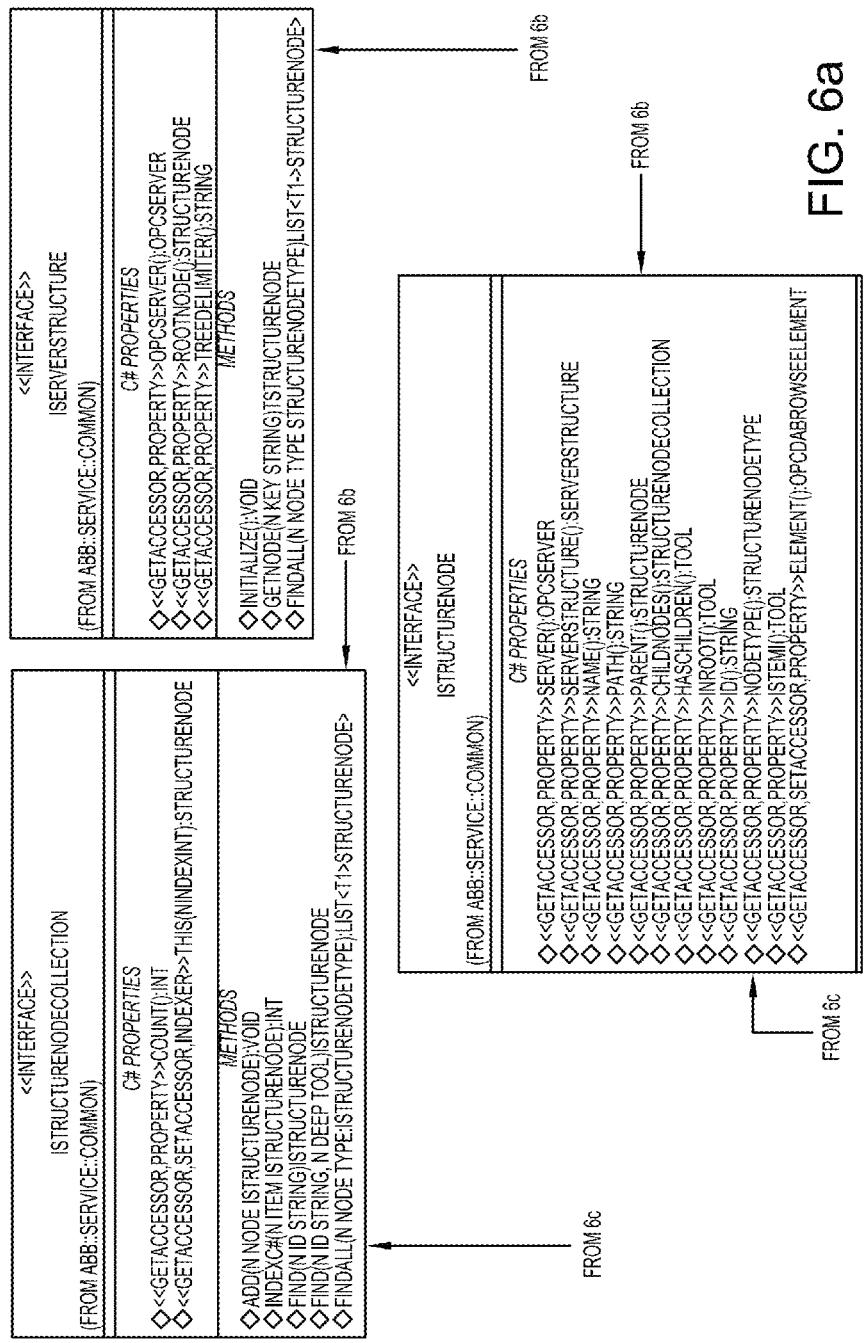
FIG. 6a is another example of a detailed item level class diagram of the data object structure of the open software framework.
Figure 6B:
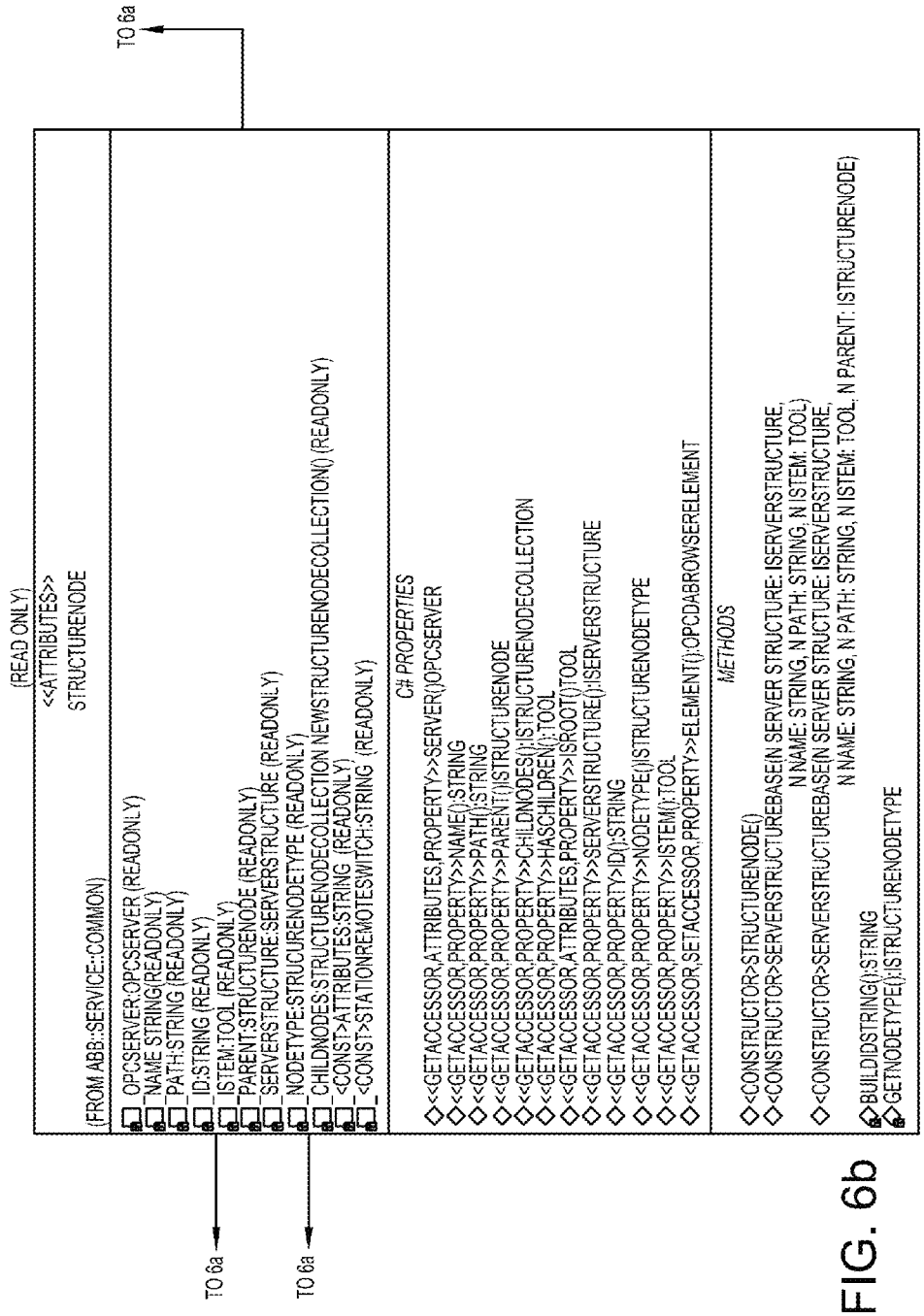
Figure 6C:
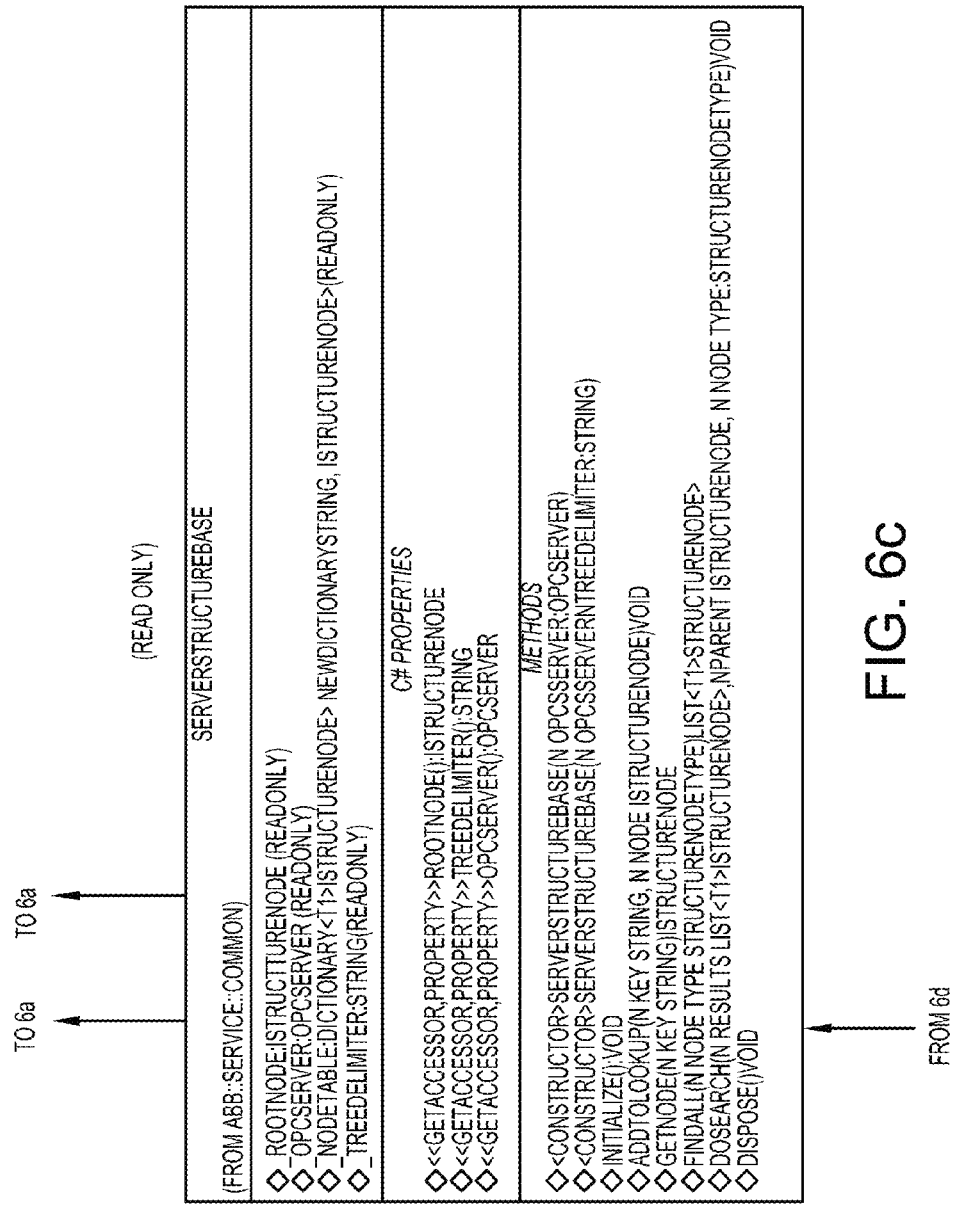
FIG. 6c is a continuation of the diagram of FIGS. 6a and 6b.
Figure 6D:
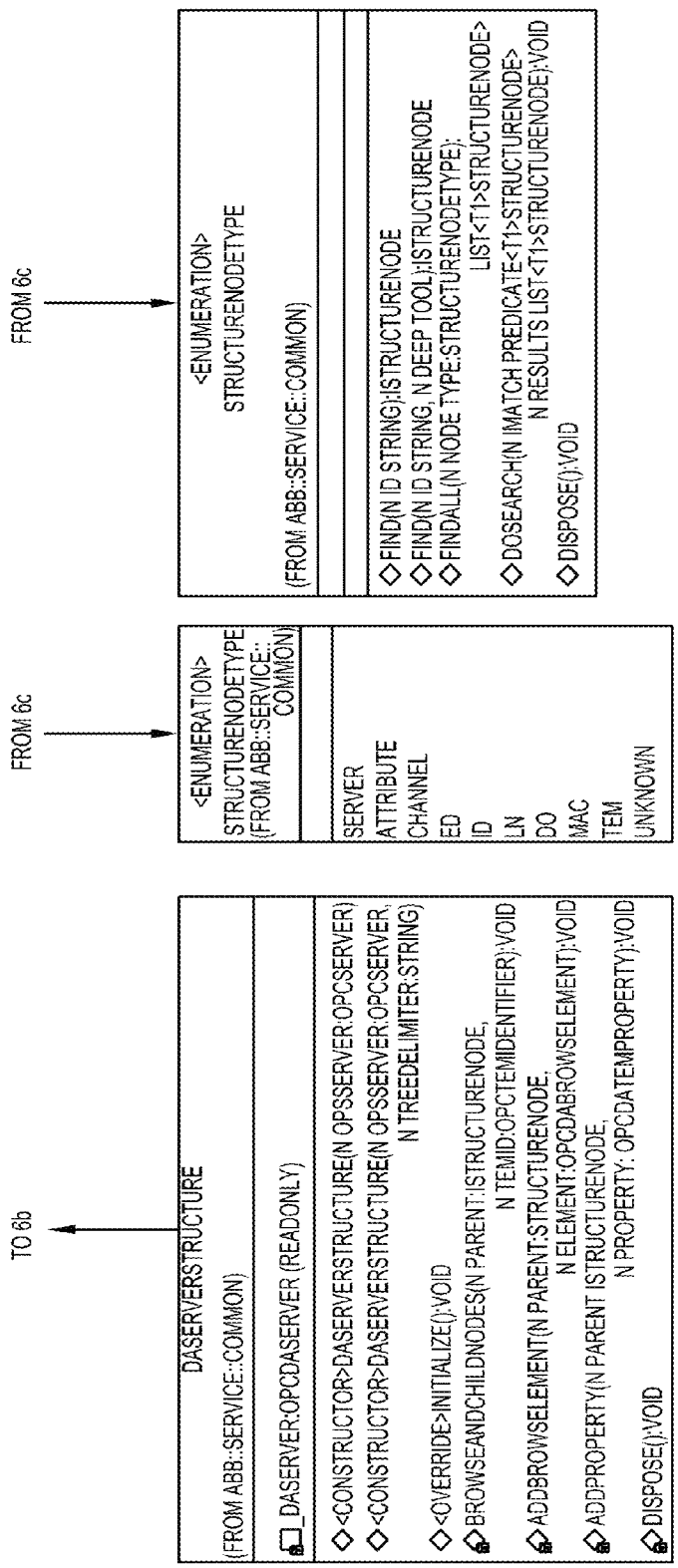
FIG. 6d is a continuation of the diagram of FIG. 6c.

With reference now to FIGS. 6*a*-6*d*, another example of a detail class diagram 46 for executing the computer code of the present invention is depicted. FIG. 6*a* shows code for retrieving the nodes and servers of an exemplary substation or grid. FIGS. 6*b* and 6*c* show code for retrieving the server definitions such as whether the servers are web, gateway, OPC, SCADA, or LDAS and data structures for data stored on the servers. FIGS. 6*b* and 6*c* also depict the manner in which the servers are connected to other servers and where each server is in the hierarchy such as parent/child relationships. FIG. 6*d* shows parameters for results lists at the data item 51 level.

Figure 7:
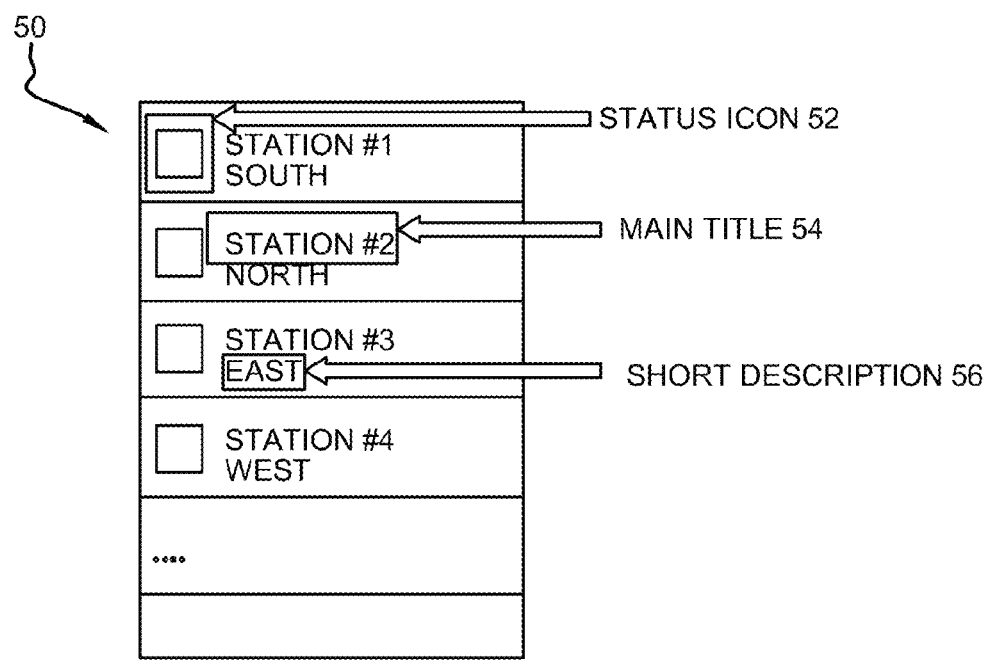
FIG. 7 is a common list view screen of the computer application.

With reference to FIG. 7, a common list view screen 50 of the substations 54 on an exemplary grid is depicted. The status 52 of the substation is shown in a color-coded icon beside the substation name 54. A short description 56 of the substation is presented below the substation name 54. It should be understood that sections of the grid being monitored as well as IEDs, sensors and other equipment on the grid may be viewed in the same manner as the substations 54 described above.

Figure 8:
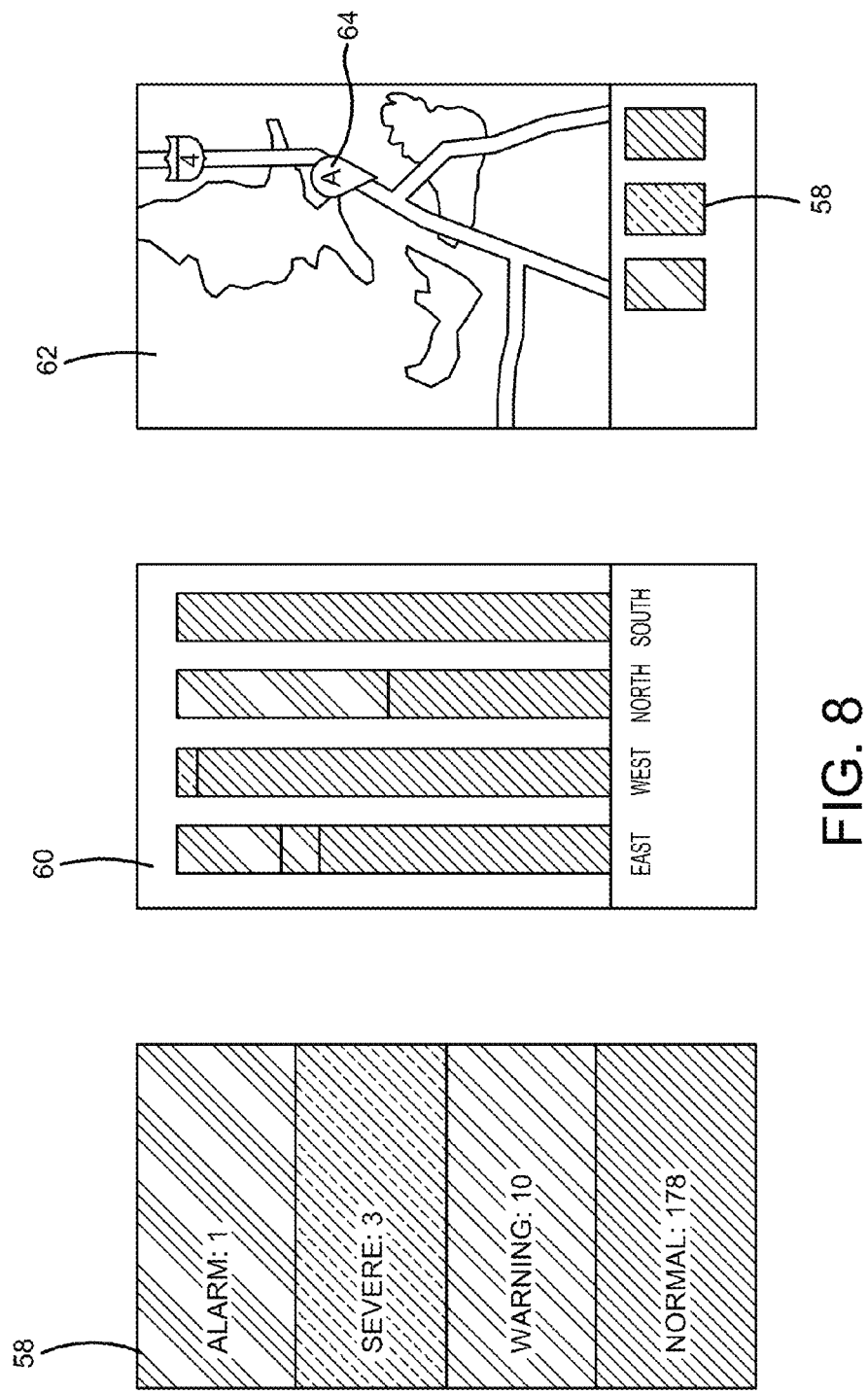
FIG. 8 shows high level status, bar chart, and map it views of object status for equipment on the power system.

Referring now to FIG. 8, a high-level status of the grid being monitored is shown. The high-level alarm view 58 of the GUI shows the various states of all substations and equipment being monitored by the LDAS. There are four statuses: alarm, severe, warning, and normal. Alarm statuses are acknowledged by the user when a value of the grid or equipment being monitored is in the acceptable value range. A time- and date-stamp is also recorded after returning the equipment or grid to a normal status. The statuses may be arranged in a high-level alarm view 58, a stacked bar chart view 60, or a map view 62 depicting the color-coded location 64 and color-coded legend indicating the severity of the operational status of the substations 54 and equipment being monitored by the system. The map view 62 has a function for providing driving directions to the location experiencing the status of interest.

Various options for viewing and grouping the status of objects being monitored on the grid are available, such as by substation grouped by status, a list of substations with status, a list of servers with status, a list of communication channels, a list of physical devices, sub-devices or logical devices, a list of sub-functions or logical nodes, a list of data object types, a list of folders or other place holder(s), and a list of data items 51.

Figure 9:
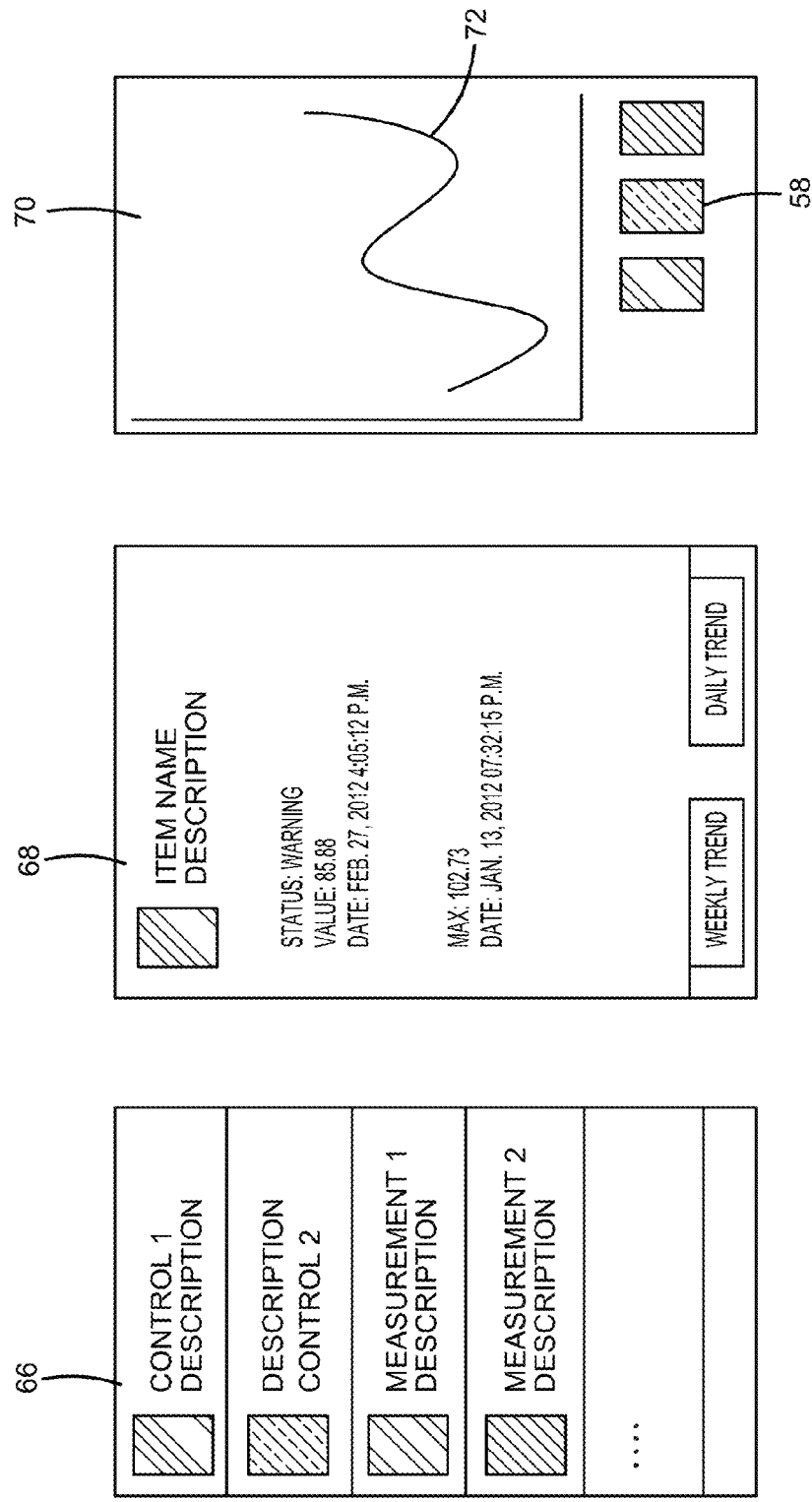
FIG. 9 is a data item view for measurements, status records, and charting values received by the computer application from the power system being monitored.

Referring now to FIG. 9, data item 51 views are shown. In screen 66, exemplary data items such as control and measurement values are shown. In screen 68, item values and status are depicted with a time- and date-stamp in addition to the threshold value (threshold value is max value=102.73 in this example) that if exceeded would change the status of the data item 51 to a severe or alarm status. Screen 70 shows a plot 72 of data points of the characteristic or property (such as amperage over time or cycles per second) corresponding to the data item 51 being monitored.

In sum, the framework 20 for developing a computer application 100 for monitoring an operational status of a power system is made up of a set of modules 22, 24, 26, 28, 32, 34, 36, 38 combinable to build the computer application 100. Each of the modules 22, 24, 26, 28, 32, 34, 36, 38 has an associated functionality selected from at least one of the following functions: security management 24, profile management 22, system configuration 26, device level views 28, event views, data access 32, background service 34, mapping/GIS 36, data service, and application programming interfaces 38. Further, each of the modules 22, 24, 26, 28, 32, 34, 36, 38 is combinable with another of the modules 22, 24, 26, 28, 32, 34, 36, 38 to develop a wide range of computer applications 100 for monitoring the operational status of the grid.

Exemplary computer applications 100 developed using the open software framework 20 are described below. The following computer applications 100 are not to be construed as limiting the invention by their implementation details, but rather, are provided as non-limiting embodiments of computer applications 100 utilizing the open software framework 20 of the present invention.

Mobile Application for Sensor Monitoring and Configuration

Figure 10:
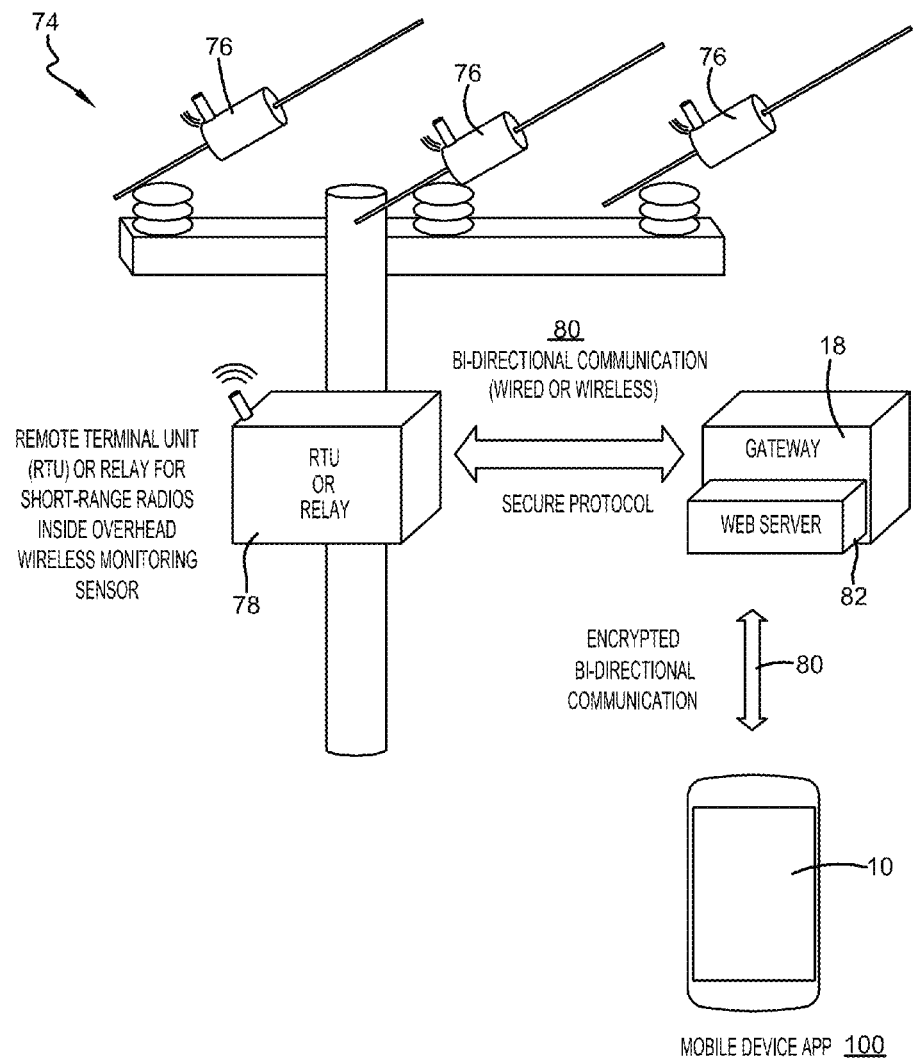
FIG. 10 depicts the architecture of a short-range wireless sensor in communication with gateway servers and the mobile device having the computer application installed thereon.

With reference now to FIG. 10, a computer application 100 developed for execution on a mobile device 10 such as a smartphone is operable to monitor fault current indicators (FCIs) 76 and other sensors installed on or near conductors of a grid to detect a fault event occurring in a section of the grid. The FCI 76 measures current and voltage values and determines when those values deviate from nominal operating ranges. The FCI 76 has an identification number which allows status tracking of the FCI 76 by mobile devices 10 and equipment on and remote from the grid. The computer application 100 of the present invention accesses the configuration settings in the FCI 76 by using the FCI identification number as a key.

The computer application 100 detects faults and sub-optimal performance of the grid, FCIs 76, sensors, and other equipment on the grid. The computer application 100 enables an encrypted bi-directional data exchange 80 between the mobile device 10 and FCIs 76. The computer application 100 receives updates on the health of the power system by connecting to microprocessors of the FCIs 76 and other sensors that monitor the grid section of interest.

An example of an FCI that is used to carry out the present invention is catalog no. 1548FH-ANC3-J-N-A, available from Thomas & Betts Corp. of Memphis, Tenn. It should be understood that the FCI provided above is by way of non-limiting example and that other FCIs and faulted circuit indicators may be utilized to carry out the present invention.

Referring now to FIG. 10, a first embodiment of communications architecture 74 for enabling communications between mobile devices 10 and FCIs 76 or other sensors installed on the grid is shown. Remote terminal units (RTU) and/or relays receive data from and/or poll the monitored FCIs 76 and communicating the polling data to gateway and web servers 18, 82 that are further in communication with the mobile devices 10. The mobile device 10 for receiving updates from the grid is embodied as a smartphone, tablet, pc, or any other device capable of executing the computer application 100 of the present invention and communicating with microprocessors of the sensors and other equipment installed on the grid.

The computer application 100 installed and executed on the mobile device 10 receives data from one or more gateway servers 18 (such as substation servers or wireless provider servers). The data is interpreted, formatted and displayed by the computer application 100 on the mobile device 10. The bi-directional communication 80 between the secured web server 82 and computer application 100 executed on the mobile device 10 is encrypted as is the bi-directional communication 80 between the secured web server 82 and the RTU/relays 78 that monitor the FCIs.

A web server 82 on the gateway 18 receives requests from the computer application 100, retrieves data from online databases, and sends the retrieved data back to the mobile device 10. In one embodiment, the web server 82 pushes alarm notifications to the mobile device 10 to wake up the computer application 100 to retrieve the latest data from the web server 82. In response to retrieved data or at any time, an authorized user may securely configure parameters in the FCI 76 or other sensor.

Figure 11:
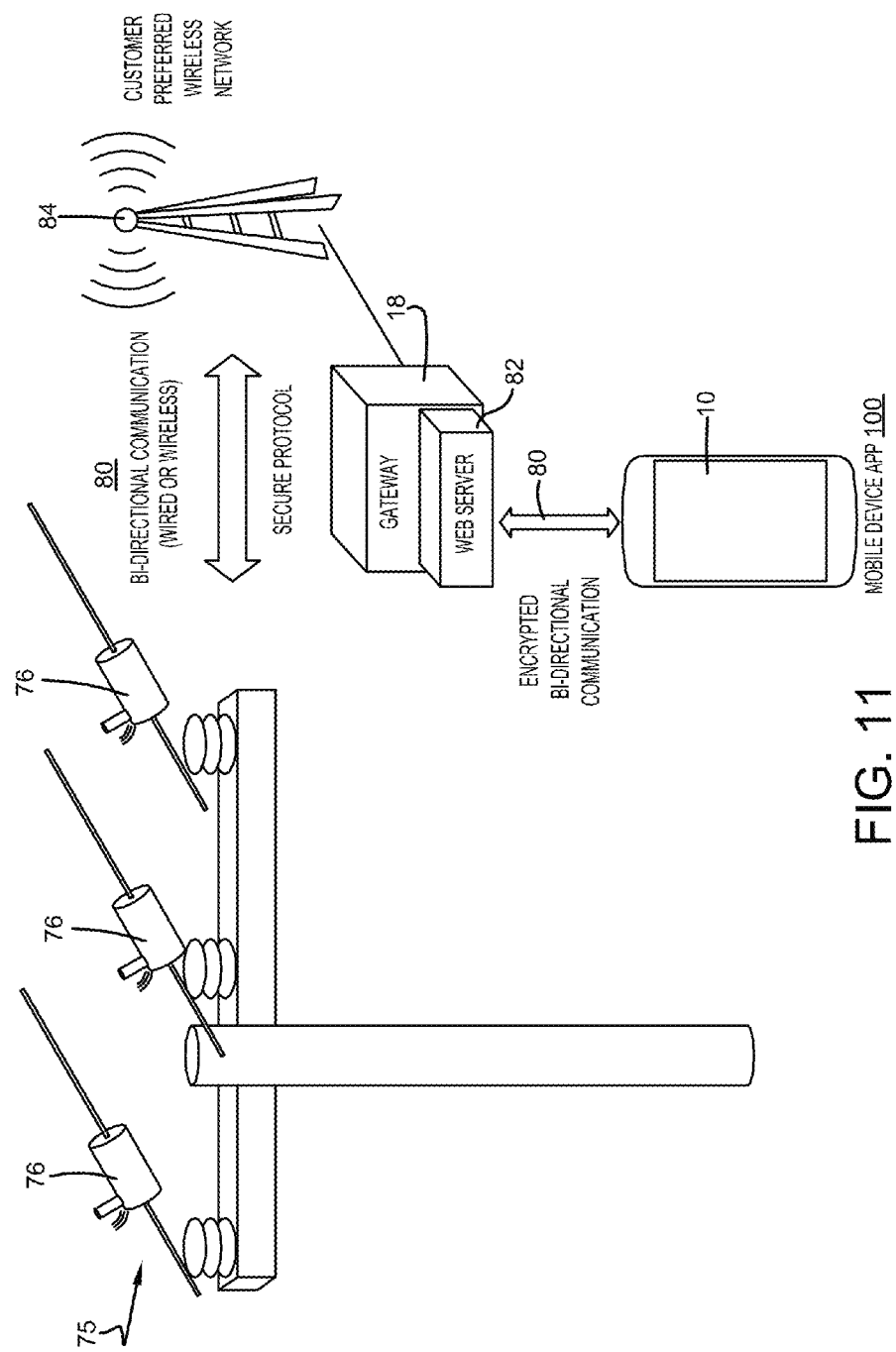
FIG. 11 depicts the architecture of a long-range wireless sensor in communication with gateway servers and the mobile device having the computer application installed thereon.

A second embodiment of the communications architecture 75 of the present invention is depicted in FIG. 11. In this example, the web server 82 retrieves data from overhead sensors 76 having long-range communication to the gateway 18 via a wireless communication partner network 84.

Figure 12:
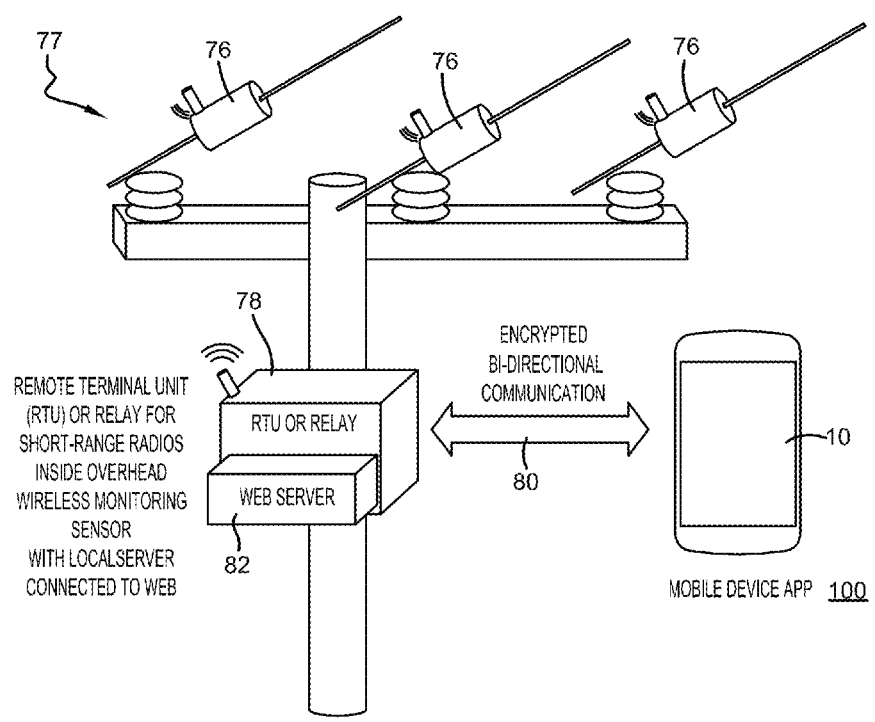
FIG. 12 depicts the architecture of short-range wireless sensors in communication with an integrated local server on a RTU/relay.

A third embodiment of the communications architecture 77 for carrying out the present invention is depicted in FIG. 12. This architecture utilizes a local web server integrated with the relay or RTU to aggregate the data from the short-range overhead wireless sensor devices.

Regardless of the communications architecture 74, 75, 77 that is utilized between the mobile device 10, the FCI 76, and other servers 18, 82, the computer application 100 is operable to effect the operation of the desired FCI 76 or other sensor installed on the grid. The computer application 100 accesses operational data of the FCI 76 from a gateway server 18 collecting and storing data for at least one substation. The operational data of the FCI 76 is accessed using an identification number representing the FCI 76. The user is able to effect the operation of the FCI 76 by changing configuration settings in the computer application 100. The mobile device 10 transmits the received configuration input from the user to the gateway server 18 and the gateway server 18 updates the configuration of the FCI 76.

Figure 13:
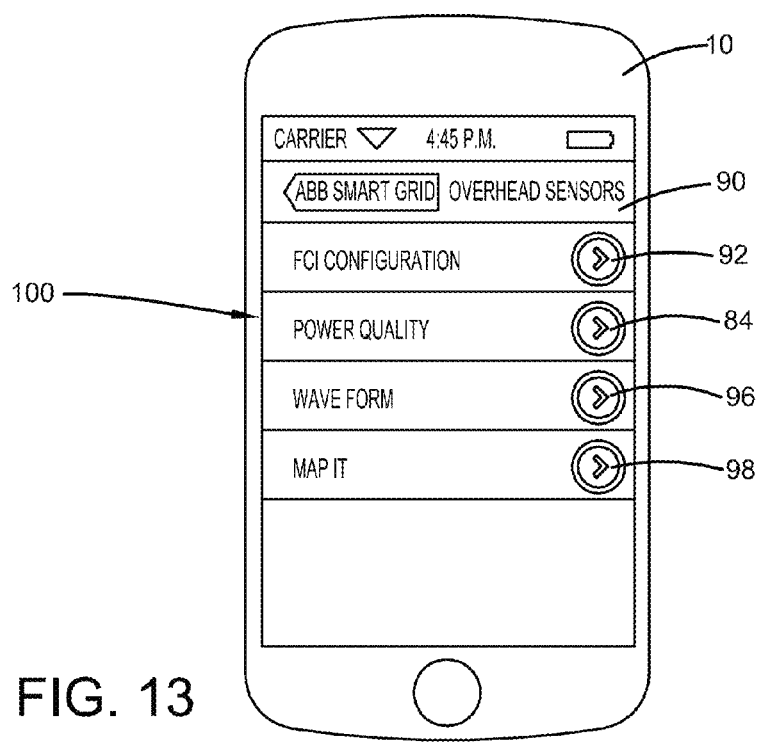
FIG. 13 depicts an application list in the computer application.

In order to change configuration settings in the FCI 76, the user accesses an overhead sensors page 90 of computer application 100 as depicted in FIG. 13. The overhead sensors page 90 provides for FCI configuration 92 (as well as configuration of other sensors), power quality configuration 94, wave form configuration 96 and GPS/GIS (Map It) functionality 98 for locating sensors on the grid.

Figure 14:
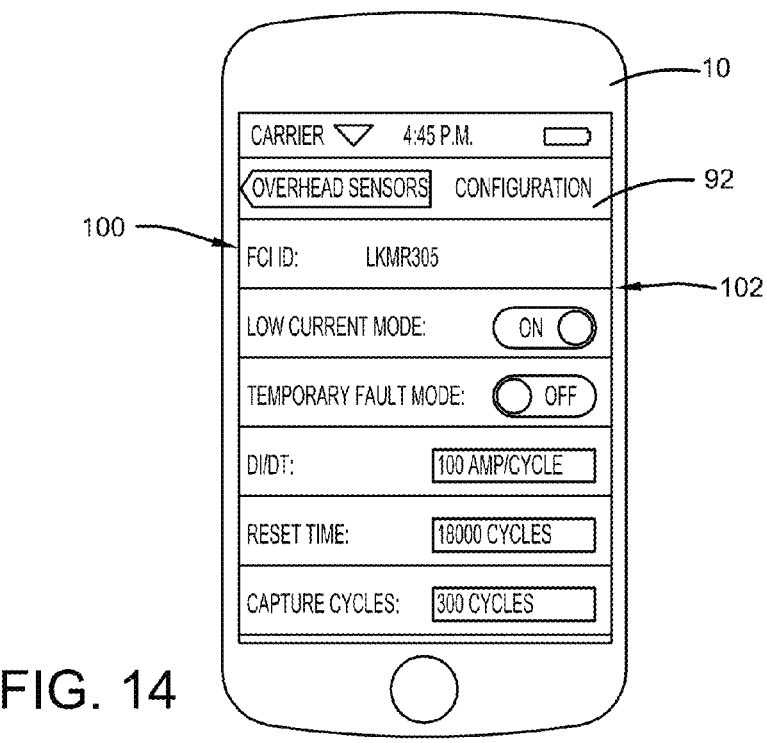
FIG. 14 depicts an FCI configuration page in the computer application.

With reference to FIG. 14, the FCI configuration page 92 is shown in detail in FIG. 14 and provides configuration options by FCI ID number 102. The FCI configuration page 92 is an interface that allows the user to modify settings for a particular FCI identification number (ID) 102. An available option in the FCI configuration page is to activate or deactivate the low current mode. When the low current mode is activated as depicted in FIG. 14, the FCIs 76 will detect sections of the grid exhibiting current values lower than a predetermined threshold.

With continued reference to FIG. 14, the FCI 76 configuration page 92 has a Temporary Fault Mode setting that, when activated, will detect transient faults that occur with a specified time window. The Di/Dt setting (in Amps/Cycle units) also available on the FCI configuration page 92, provides for configuration of a threshold that the rate rise of anode current may not exceed at the time of thyristor activation. The Reset Time setting allows for the configuration of the number of elapsed cycles that trigger a re-set of the device associated with the FCI ID. The capture cycles setting allows the user to configure the number of cycles that are captured during a detected fault event.

Figure 15:
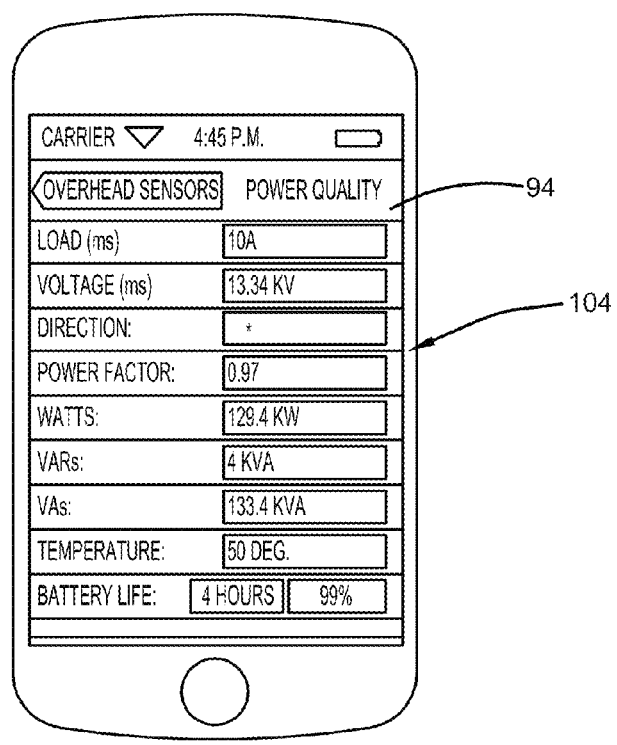
FIG. 15 depicts the power quality page of the computer application.

Referring now to FIG. 15, the Power Quality page 94 provides real-time measured values for the diagnosis of faults for the sensor ID of interest. The real-time measured values include but are not limited to temperature of the conductor and ambient temperature, average load RMS current, estimated average RMS line voltage based on change in voltage, harmonics, power factor (Watts/VA), Real Power (Watts), Apparent Power (VA), Reactive Power (VARs) and direction of current (+-). Other measurements tracked by the application are battery life of the sensors (in hours) and battery charging capacity status (in %).

Figure 16:
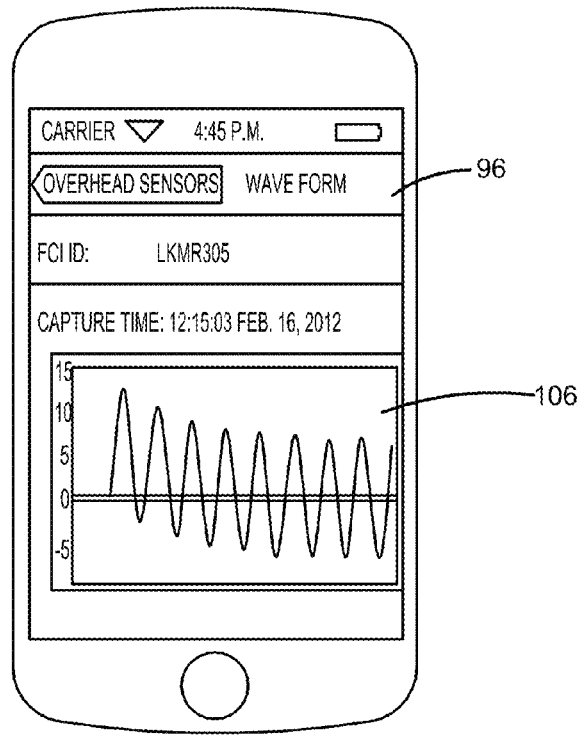
FIG. 16 depicts the waveform viewer of the computer application.

The Wave Form page 96 provides a plot of the electrical current waveforms during the interval configured in the Capture Cycles setting of the FCI Configuration page 92. An example of a Wave Form viewer 106 and a plot of data points generated by the application 100 are depicted in FIG. 16. The user can scroll or hover over data points in the wave form viewer 106 to display numeric values for data points of interest.

Figure 17:
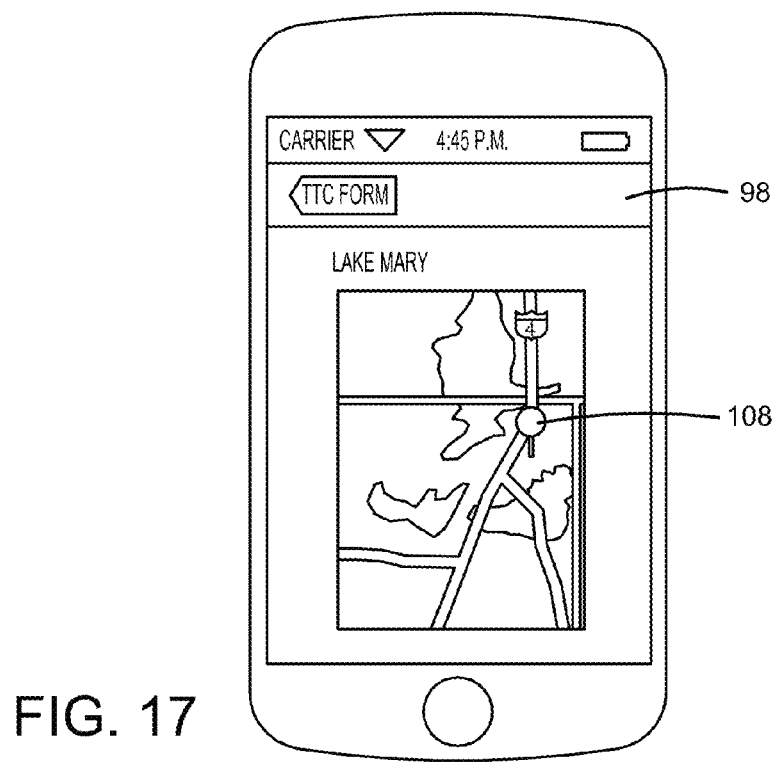
FIG. 17 depicts the mapping functionality of the computer application.

With reference now to FIG. 17, the Map It page 98 of the computer application 100 is used to display the location 108 on the map where the FCI 76 or other overhead sensor of interest is present. The location 108 may be indicated by a push pin, flag or another type of marker. The location 108 may also be color coded to distinguish the user's location from the target location/destination.

The FCI 76 has a particular FCI ID and is located using GPS and in some embodiments GIS. In the embodiment using GPS in conjunction with GIS data, spatial correlations are rendered between FCIs 76, sensors and other equipment on the grid. In that same embodiment, the FCI identification number is associated with a GIS value.

The Map It 98 functionality provides driving directions to the desired FCI 76 or sensor in mobile devices having the "use current location" feature or similar setting enabled on the mobile device 10. Further, the health of equipment or a section of the network upon which the FCIs 76 are installed is assigned a color code such as red to represent immediate service required, yellow to represent maintenance required, and green to represent FCIs 76 or sensors detecting normal operation within predefined parameters and no service requirement at the time of map creation.

Figure 18:
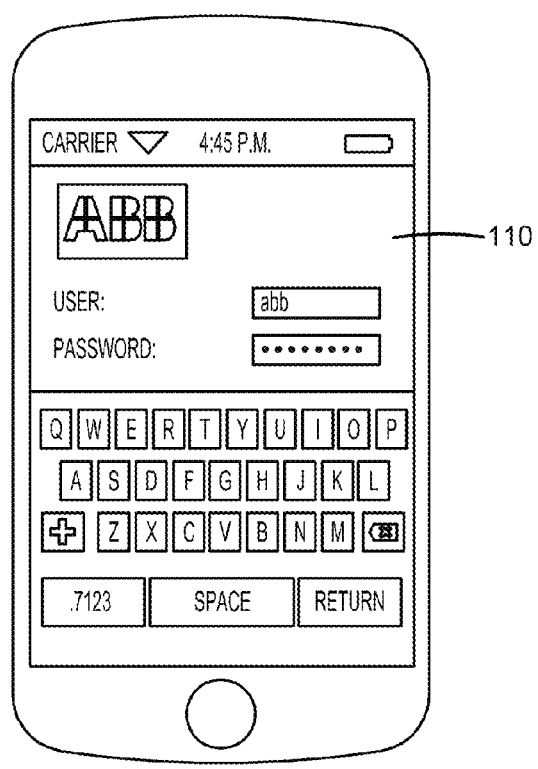
FIG. 18 depicts the login and authentication page of the computer application.

Referring now to FIG. 18, an authentication and authorization page 110 is shown. End users are required to enter credentials each time they launch the computer application 100. Prior to the installation of the computer application 100 on the mobile device 10, the user ID, user group, and unique device ID are hashed as an authorization code. In each request, the computer application 100 includes the authorization code and user ID.

The web server 82 then receives the request and determines whether the authorization code matches the user ID in order to determine the access level of the user. In one embodiment, the security management module 24 of the open software framework 20 manages the authentication and authorization functionality of the computer application 100 upon receipt of the authentication request by the web server 82. Transport layer security may be used to further enhance the security of communications occurring over the Internet between the end user's mobile device 10 and the web server 82.

Timer and alarm settings are configurable via the computer application 100 and are operable to power-on, power-off, or re-set the FCIs 76 and other sensors on the grid in the event that in-rush current or another type of transient fault is detected for a user-specified duration. The alarm settings require acknowledgement by a user that the fault event has been cleared.

In one embodiment, the computer application 100 is operable to receive, aggregate, and view data from multiple overhead monitoring FCIs 76 and sensors on the grid. In that same embodiment, the computer application 100 provides access to the configuration settings of multiple overhead monitoring sensors concurrently. In addition, multiple values of the wave form profiles for several FCIs 76 may be selected, viewed, and aggregated for reporting and monitoring purposes.

The computer application 100 further supports adaptive fault trip levels that are thresholds configured to change with the manner in which the distribution network is performing over a period of time. For example, the remote configuration of FCIs 76 enabled by the computer application 100 allows utility companies to adapt the fault parameters to the dynamic fault signatures of a grounded power system network. This means that utility companies are not bound to the fixed fault parameters of the sensors installed on the grid. Previously, utility companies would update the fault parameters reactively, by replacing old sensors having fixed parameters with new sensors having the desired set of fixed parameters.

As the ability to configure settings in and effect the operation of an FCI 76 is enabled by the present invention, utility companies do not have to install a new FCI 76 to achieve new parameters in the FCI 76. In this manner, utility companies are enabled to adapt to dynamic fault signatures of the grid that change over time with varying load profiles, changing environmental conditions, performance changes of existing neighboring devices on the grid, introduction of new distribution devices, or removal of existing devices on the grid. Additionally, the computer application 100 is operable to create risk indexes for sensors and sections of the grid using historical and real-time data from the servers and made available on the end user's mobile device 10.

The computer application 100 may lead to a reduction in installation time of FCIs 76 and reduce outage restoration time of a faulted circuit on the grid because the computer application 100 provides expedited data to the appropriate utility personnel as well as a user interface for effecting configuration changes that impact grid operation positively. As a result, utility companies may lower their costs and satisfy targets for operational metrics such as System Average Interruption Duration Index (SAIDI), System Average Interruption Frequency Index (SAIFI), and Customer Average Interruption Duration Index (CAIDI).

Mobile Application for Grid Monitoring and Maintenance

A computer application 100 for monitoring an electrical grid and updating utility company personnel (end users) with real-time grid status is developed using the open software framework 20. An end user installs and executes the computer application 100 on a mobile device 10 and is able to request and receive grid status using the mobile device 10. The mobile device 10 retrieves data from a substation gateway 18 and provides the end user with grid status and maintenance schedules.

Figure 19:
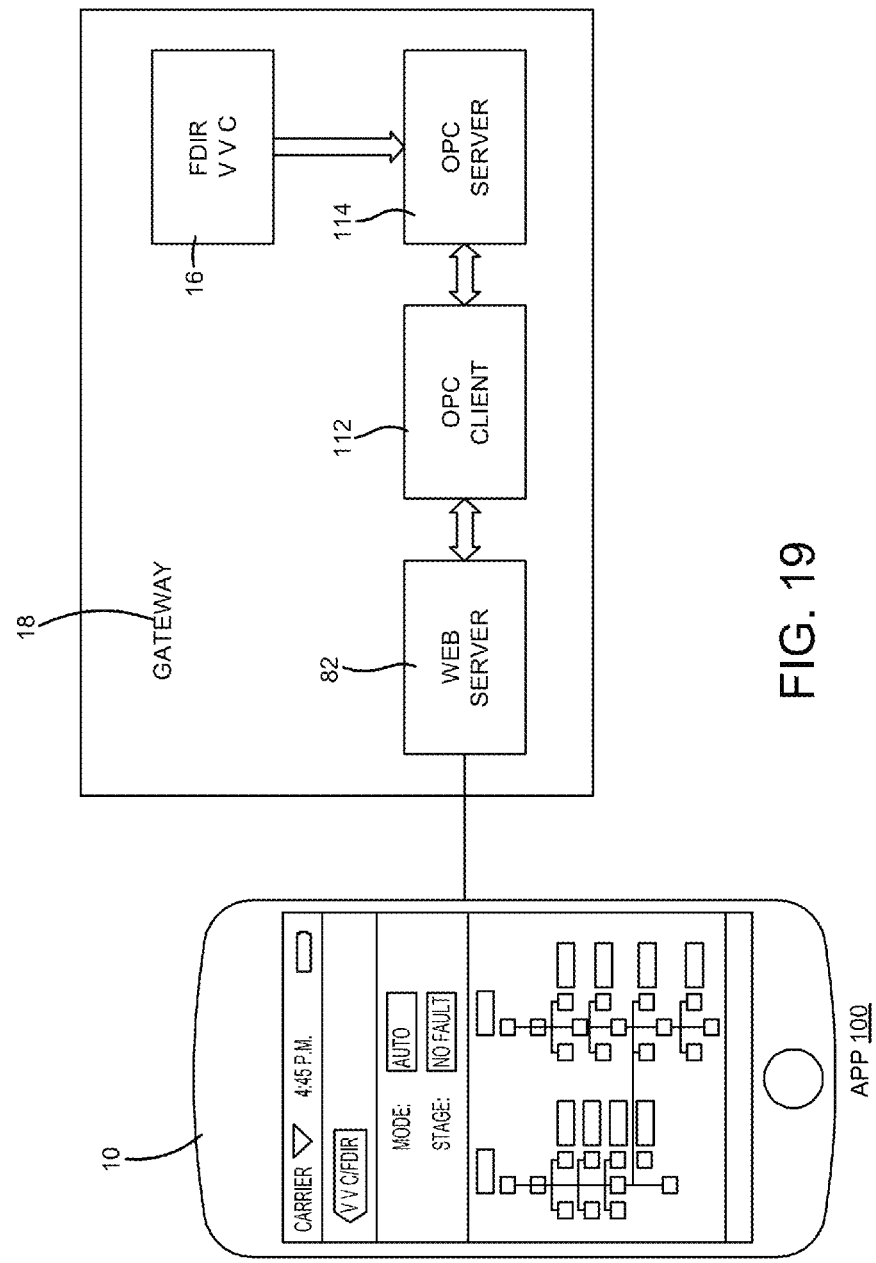
FIG. 19 shows the architecture for communications between FDIR/VVC systems, an OPC server, an OPC client, a web server, and the mobile device having a computer application of the present invention installed thereon.

Referring now to FIG. 19, architecture for transmitting data from one or more substation gateways 18 to a mobile device 10 is depicted. Fault Detection, Fault Isolation, and Load Restoration (hereinafter "FDIR") and Volt Var Control (hereinafter "VVC") operations 116 are implemented on the grid. FDIR operations are operable to detect faults and send open or close commands to parts of the network such as a feeder branch. As a result of the open or close commands, devices on the grid are de-energized or energized within minutes. Similarly, VVC logic is operable to maintain power quality by adjusting the voltage of capacitor banks based on detected phase shifts in voltage and/or current in the power system. The operations carried out by FDIR and VVC operations 116 are immediately updated in the substation gateway servers 18 as they occur.

Notice of FDIR and VVC operational 116 status is crucial to utility personnel safety. When utility personnel are not in the NCC viewing the updates and alarms directly, they are able to receive the updates and alarms on the mobile device 10 remote from the substation.

The mobile device 10 is operable to connect to a substation gateway 18 comprising a web server to retrieve real-time and historical data from the substation as well as FDIR and VVC operations. The substation gateway 18 also has one or more OPC clients 112, an OPC server 114, and LDAS or SCADA system. The OPC server receives data from electronic devices and equipment such as transformers, fault current sensors, and having Fault Detection, Fault Isolation, and Load Restoration (hereinafter "FDIR" and Volt Var Control (hereinafter "VVC").

FDIR and VVR operational 116 statuses are transmitted to the OPC server as depicted in FIG. 19. The OPC server 114 has bi-directional communication with one or more OPC clients 112. Further the OPC server has bi-directional communication with the web server 82. Once the web server 82 accesses the desired data, the data is automatically made available to the computer application 100 on the mobile device 10 or the mobile device 10 may request the data from the web server 82.

With continued reference to FIG. 19, a single line diagram is depicted on the screen of the mobile device 10. The single line diagram is a schematic of the network of interest and shows the source, load, and devices such as transformers, circuit breakers, switchgear, re-closers, switches, and sensors.

Figure 20:
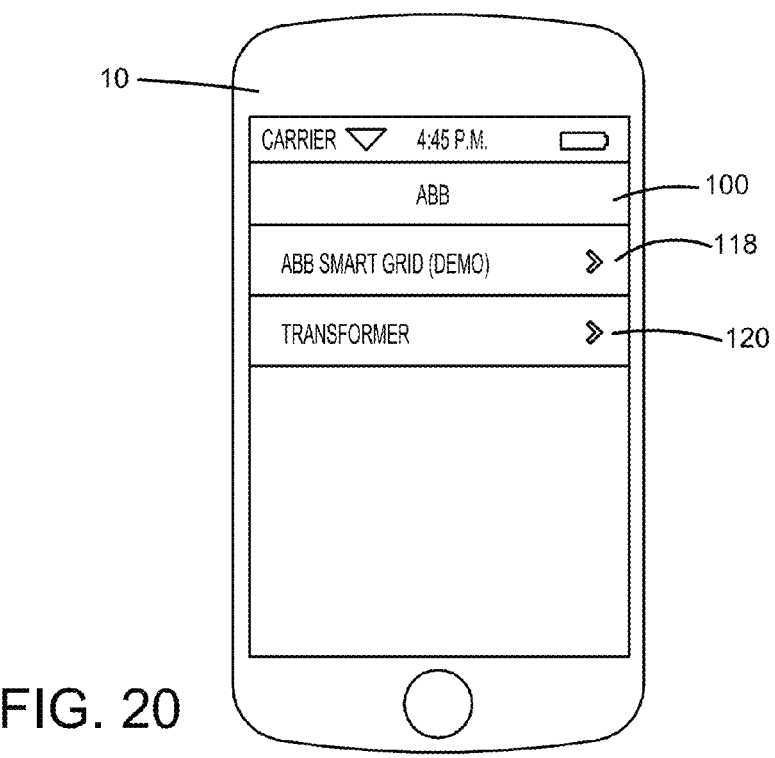
FIG. 20 shows a selection page broken down by exemplary business units in the computer application.

With reference now to FIG. 20, the user must select a business unit 118, 120 as shown in FIG. 20. The user must belong to the business unit 118, 120 by way of configuration in the user's security profile in the user management 22 and/or security management 24 modules of the open software framework 20, in order to access the computer application 100. Once the user is authenticated, the user is presented with an application list 118 corresponding to the business unit 118, 120 selected. It should be understood that business unit and application list are exemplary parameters and that the computer application 100 may be developed using parameters based on business needs of the particular industry.

Figure 21:
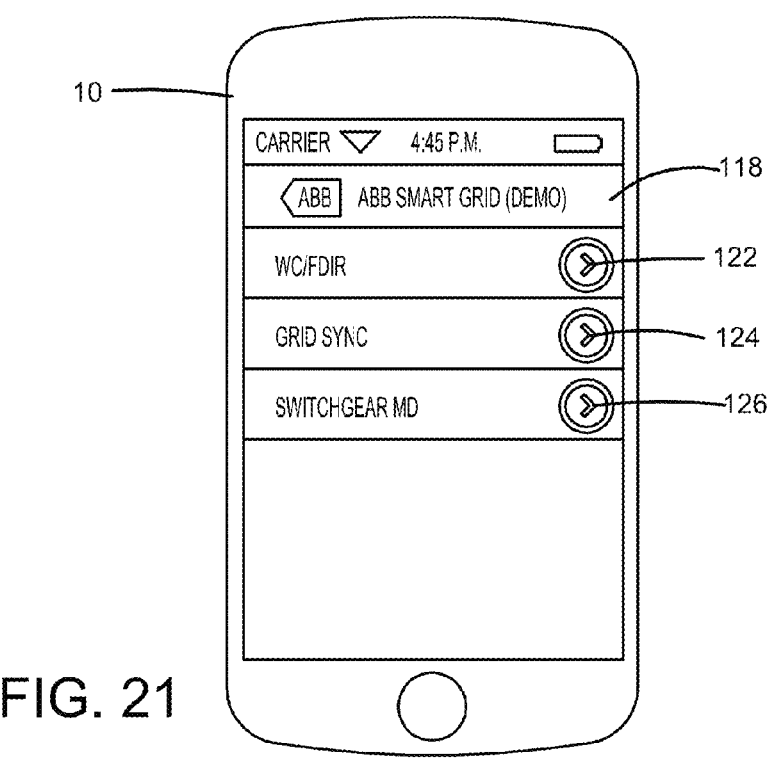
FIG. 21 shows an application list in the computer application.
Figure 22:
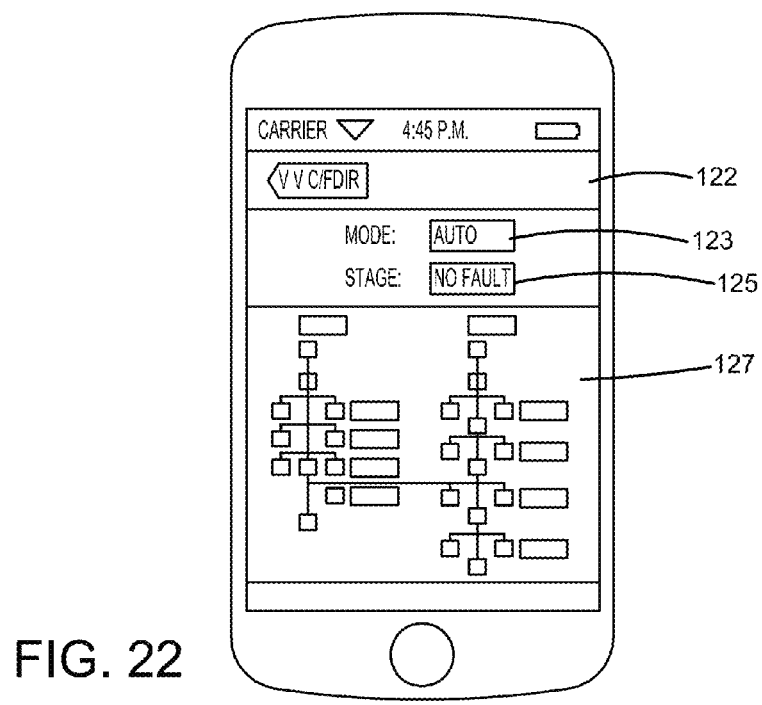
FIG. 22 shows FDIR configuration and a single-line diagram of a monitored power system network.

Referring now to FIG. 21, the application list 118 provides the following options: VVC/FDIR 122, GridSync 124, and SwitchgearMD configuration pages. If the user selects VVC/FDIR 122 configuration, the VVC/FDIR configuration page 122 is displayed. If the end user further selects the FDIR configuration page depicted in FIG. 22, the user is presented with a schematic 127 of the grid. The FDIR configuration page 122 also displays and allows for changes to the FDIR operational mode 123 and FDIR operational stage 125. The FDIR operational mode 123 has the options of auto, manual, or test. The FDIR operational stage 125 has the settings of no fault, fault, isolation, restoration, return to normal.

Figure 23:
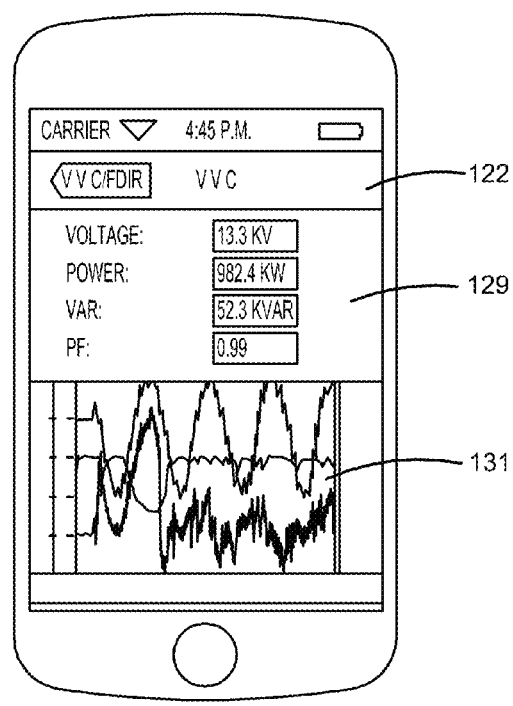
FIG. 23 shows real-time VVC control values and trends of selected variables.

With reference now to FIG. 23, the VVC configuration page 122 displays critical real-time control values for variables such as voltage, power, Var (volt-ampere-reactive), and power factor (ratio of real power provided to the load to the apparent power in the circuit or node) for predetermined locations on the grid. The VVC configuration page 122 allows the end user to select the desired variables and plot 131 the values of the selected variables.

Figure 24:
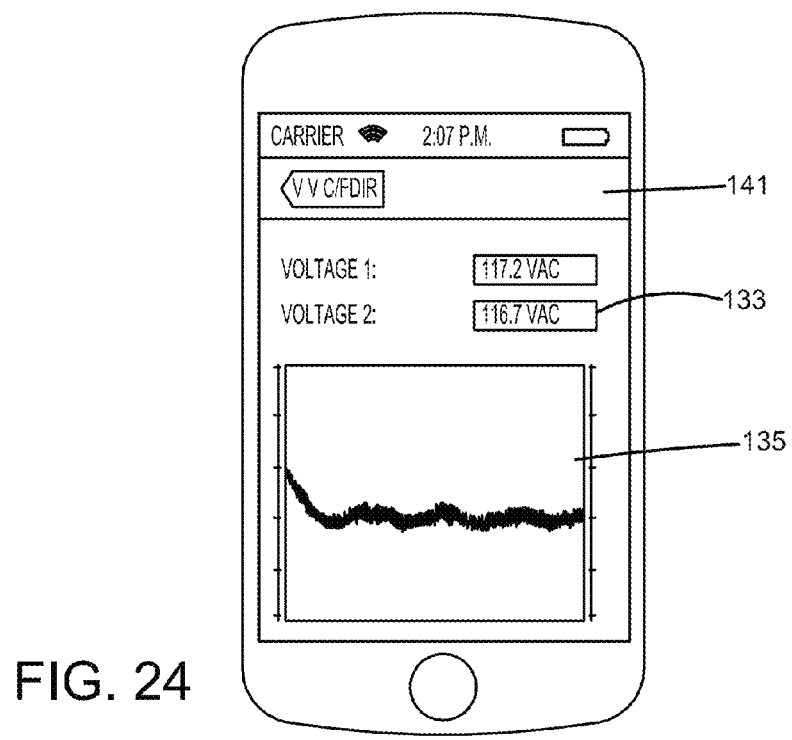
FIG. 24 shows voltage values and trends for systems under CVR control.

Referring now to FIG. 24, the conservation voltage reduction (CVR) page 141 is depicted. The CVR page 141 displays the voltage values and trends evaluated under CVR control parameters. CVR is a modeling method that reduces grid demand through controlled reduction in operating voltage at consumer load points. CVR modeling uses algorithms based on real-time and historical power system measurement values to reduce grid demand. The voltage values (1 and 2) 133 indicate the voltage values at locations on the grid under CVR control such as residences.

Figure 25:
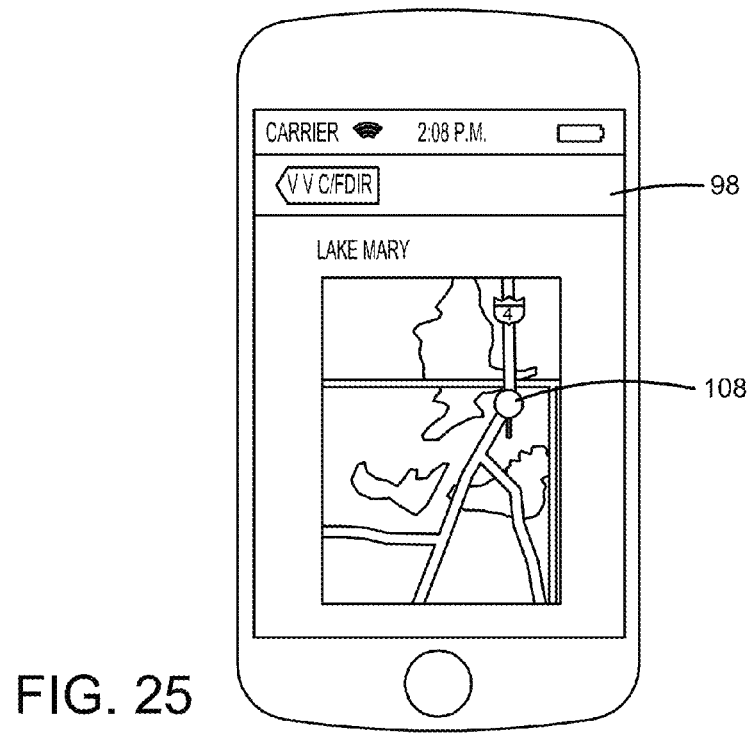
FIG. 25 displays the mapping function that uses the mobile device's GPS functionality and GIS data to determine the mobile device's location, the location of the desired point or equipment on the power system, and determines driving directions between the mobile device location and the desired end point.

With reference now to FIG. 25, a device location 108 exhibiting a fault status as determined by FDIR/VVC operations is shown on the map page 98. The map page 98 provides directions from the location of the end user's mobile device 10 to the device location exhibiting a fault status 108. In one embodiment, when the end user is logged into the computer application 100, a fault message appears on the screen in real-time as the FDIR/VVC diagnoses the fault. The end user can click on or otherwise open the fault message which further directs the end user to the map page 98 showing the device or location on the grid exhibiting the fault status 108 and providing driving directions from the user's location to the device location exhibiting the fault status 108.

With reference now to FIG. 33, the map page 98 shows the spatial relationship between a switch at the grid feeder 212, the user's current location 108, and a target location 210. Additionally, the map page shows the location and statuses of switches 218 and power distribution lines 214, 216. Switch 218 is depicted on the map as an open square to indicate that the switch 218 is open and electricity is not flowing at that switch 218 location. Switch 212 at the feeder has a filled square to indicate that switch 212 is closed and electricity is flowing from the feeder to other locations on the grid. The power distribution lines 214, 216 are color-coded to indicate the operational status of the power lines wherein one color indicates that electricity is not flowing through the power line and a different color indicates that electricity is flowing through the power line along a section of the grid. In the FIG. 33 example, electricity is not flowing through power line 216 which has an open switch near target location 210 whereas power line 214 is active with electricity flowing. In that same example, the user is able to request driving directions from the user's location 108 to the target location 210 experiencing the interruption in electric service.

Figure 26:
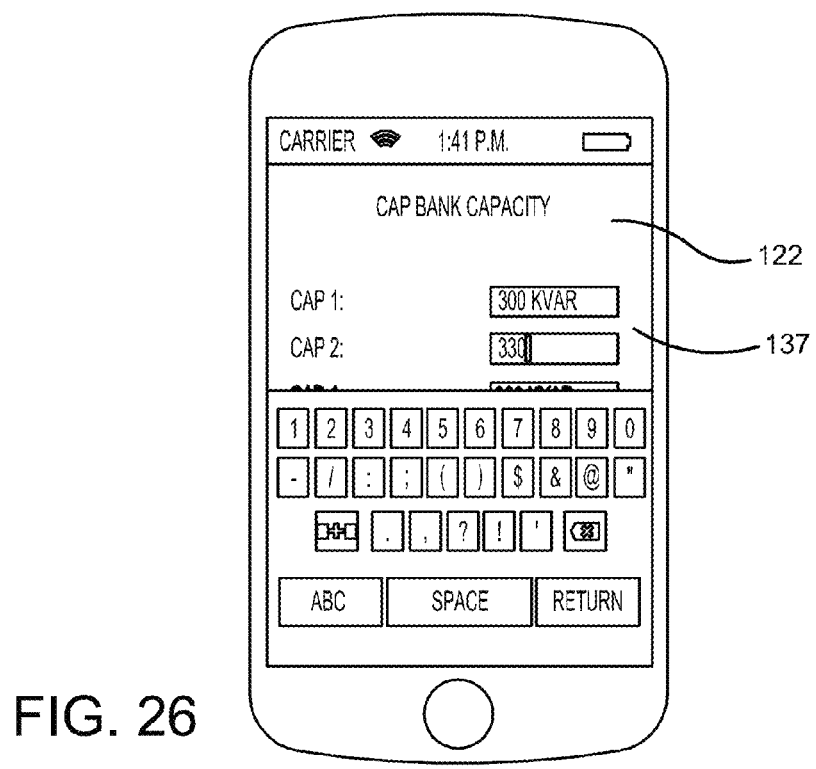
FIG. 26 shows a configuration page for capacitor bank capacity.

Referring now to FIG. 26, a control setting page 122 is displayed. In the control setting page 122, the end user is able to modify control settings of a capacitor bank on the grid as well as enable or disable devices on the grid from a remote location. In the control setting page 122, the reactive power setting for capacitor banks, such as capacitor banks 1 and 2 on the grid, may be modified to effect a change in the reactive compensation system with modular fixed or switched capacitor steps that will automatically compensate an individual load or the network to maintain a preset level of power factor. In the present example, the reactive power setting is shown in kilovolt-ampere-reactive (kVAR) units and is modifiable by a user to effect a change in the reactive compensation system.

Figure 27:
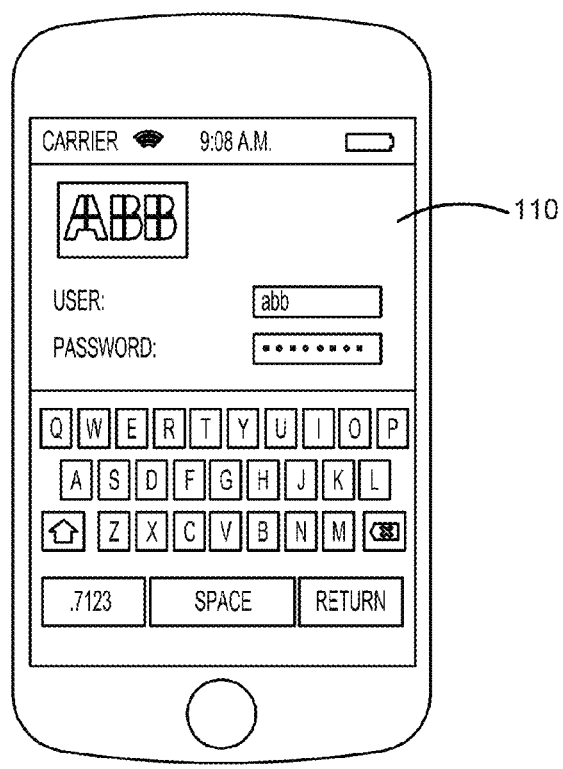
FIG. 27 shows a login screen for the computer application.

With reference to FIG. 27, an authentication and authorization page 110 is shown. End users are required to enter credentials each time they launch the computer application 100. Prior to the installation of the computer application 100 on the mobile device 10, the user ID, user group, and unique device ID are hashed as an authorization code. In each authentication request, the computer application 100 includes the authorization code and user ID.

The web server 82 then receives the request and determines whether the authorization code matches the user ID in order to determine the access level of the user. In one embodiment, the security management module 24 of the open software framework 20, manages the authentication and authorization functionality of the computer application 100 upon receipt of the authentication request by the web server 82. Transport layer security may be used to further enhance the security of communications occurring over the Internet between the end user's mobile device 100 and the web server 82.

Mobile Application for Monitoring the Health of Assets on the Grid

A computer application 100 for notifying end users of the condition of assets (hereinafter "asset health") installed on the grid such as switchgear, reclosers, and circuit breakers is provided. The computer application 100 monitors measured values of the assets including but not limited to temperature, current and pressure. The measured values may be real-time or historical values or a comparison between those values. The real-time and historical values may be compared to predetermined thresholds or intervals.

The asset health computer application 100 is installed on the end users mobile device 10 and is built using the open software framework 20. The computer application 100 provides live data and measurements from assets, operating attribute trending views, an overall asset health status view and maps depicting the locations of the assets. Abnormal conditions in the power system assets raise an alarm in the computer application 100 and notifications are sent to the mobile device 10 of the particular end user(s) tasked with responding to the alarm from the computer application 100.

Figure 28:
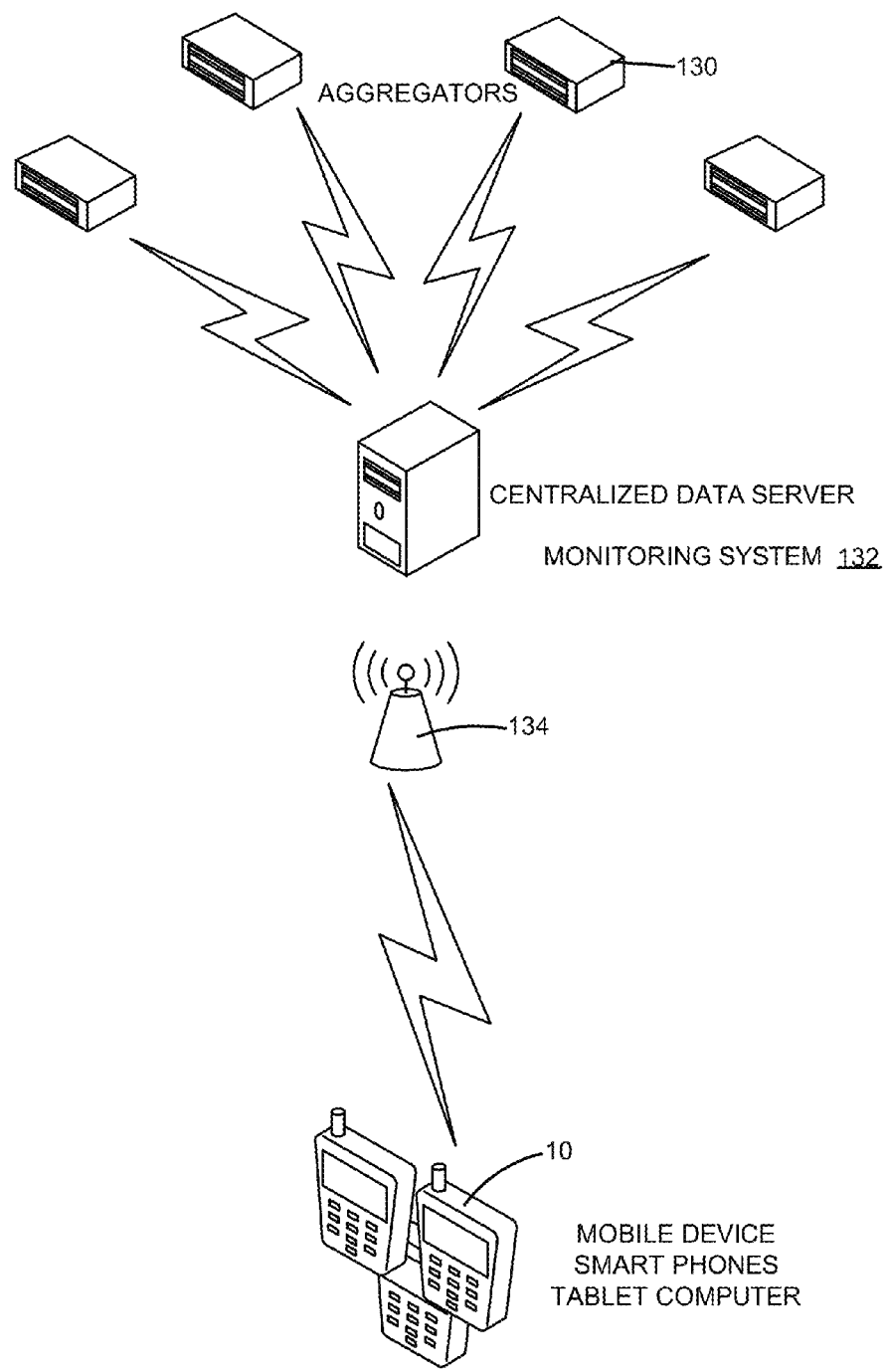
FIG. 28 shows a system topology for communications between data aggregation servers, an asset health monitoring system, and mobile devices.

With reference now to FIG. 28, system architecture supporting the asset health computer application 100 is depicted. Data aggregation servers 130 collect data from the assets and provide a unified output in Extensible Markup Language (XML) or JavaScript Objection Notation (JSON) format to the centralized data server 132 of the asset health monitoring system 132. The end user devices 10 request and receive data via a wireless connection 134 to the centralized data server 132 of the asset health monitoring system.

Figure 29:
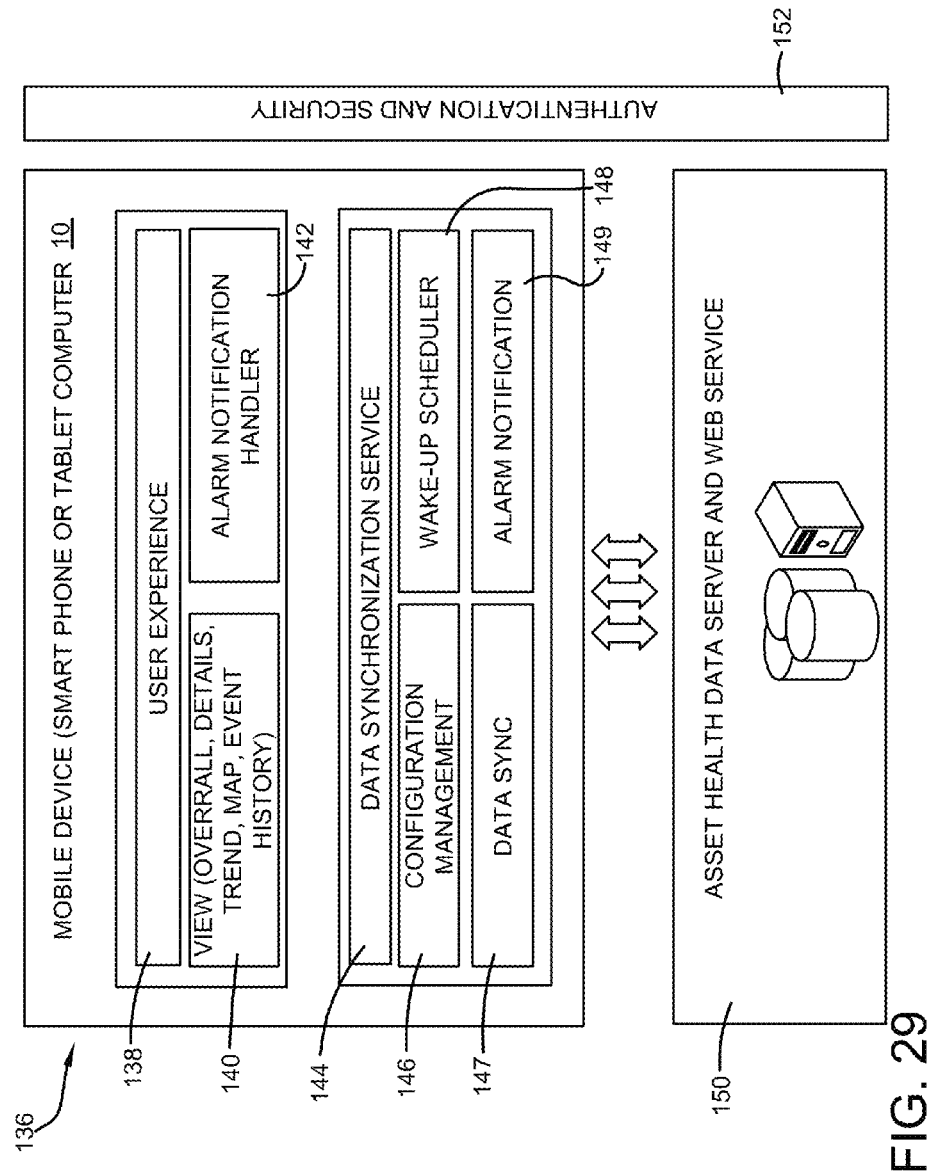
FIG. 29 shows a logical view of the bi-directional communication between the mobile device having an asset health computer application installed thereon, the functionality within the asset health computer application and an asset health data server, both the asset health computer application and data server shown utilizing common authentication and security modules.

The asset health computer application 100 delivers the functionality shown in FIG. 29. An asset health data server 150 implemented on a web service has a bi-directional communication with the mobile device 10 to enable the computer application 100 to receive data on health of assets installed on the grid. Examples of assets that are monitored using the asset health computer application 100 include but are not limited to transformers, sensors, and switchgear.

The asset health application 100 has user experience 138 settings that control the presentation of the GUI, viewers and messaging of the computer application 100 on the mobile device 10. The user experience functionality 138 includes viewers for overall power system health, detailed views for individual assets, data trends and plots, maps and event history. The power system health view 140 provides an overall status view of monitored assets grouped by status and categories.

The user experience functionality 138 provides a map view having locations of the assets marked with a push pin, flag or similar marker. Asset markers are color-coded to indicate the status and/or health of the assets. The map markers have a drill down function for a detailed view of the operational status of the asset of interest. The maps allow the user to link assets of interest and provide driving directions between assets of interest or between the end user's location and the asset(s) of interest. The map view of the user experience functionality 138 utilizes GIS data to locate the assets and determine the spatial arrangement of assets in relation to other assets.

The user experience functionality 138 also provides an alarm notification handler 142. The alarm notification handler 142 provides notification of abnormal incidents or operation of assets on the grid through broadcast messaging on the devices 10 of end users responsible for the particular assets. When an end user acknowledges an alarm or that a maintenance item is complete, a broadcast message is also sent to the devices 10 of other end users having the appropriate security profiles allowing them to receive the broadcast message. The end user may acknowledge an alarm directly from the mobile device 10 on which the alarm notification 149 was received.

The data synchronization service 144 of the computer application 100 has configuration management, wake-up scheduling, data sync, and alarm notification modules 146, 147, 148, 149. The configuration management module 146 allows for configuration of the refresh rate of the data exchange between the computer application 100 and the asset health data server 150. The wake-up scheduling module 147 ensures that the end user devices 10 are active to receive data and notifications from the asset health computer application 100. The data sync module 148 synchronizes the data with the central substation control center over secured connections. The alarm notification module 149 raises notifications to the end user devices 10 when assets on the system are exhibiting measured or calculated values outside of predetermined thresholds or ranges for those values.

As depicted in FIG. 29, the authentication and security module 152 interfaces with the asset health data server 150 and the mobile device 10 having the computer application installed thereon. End users must authenticate prior to receiving access to the computer application 100 as already described for the other computer applications 100 of the present invention.

Figure 30:
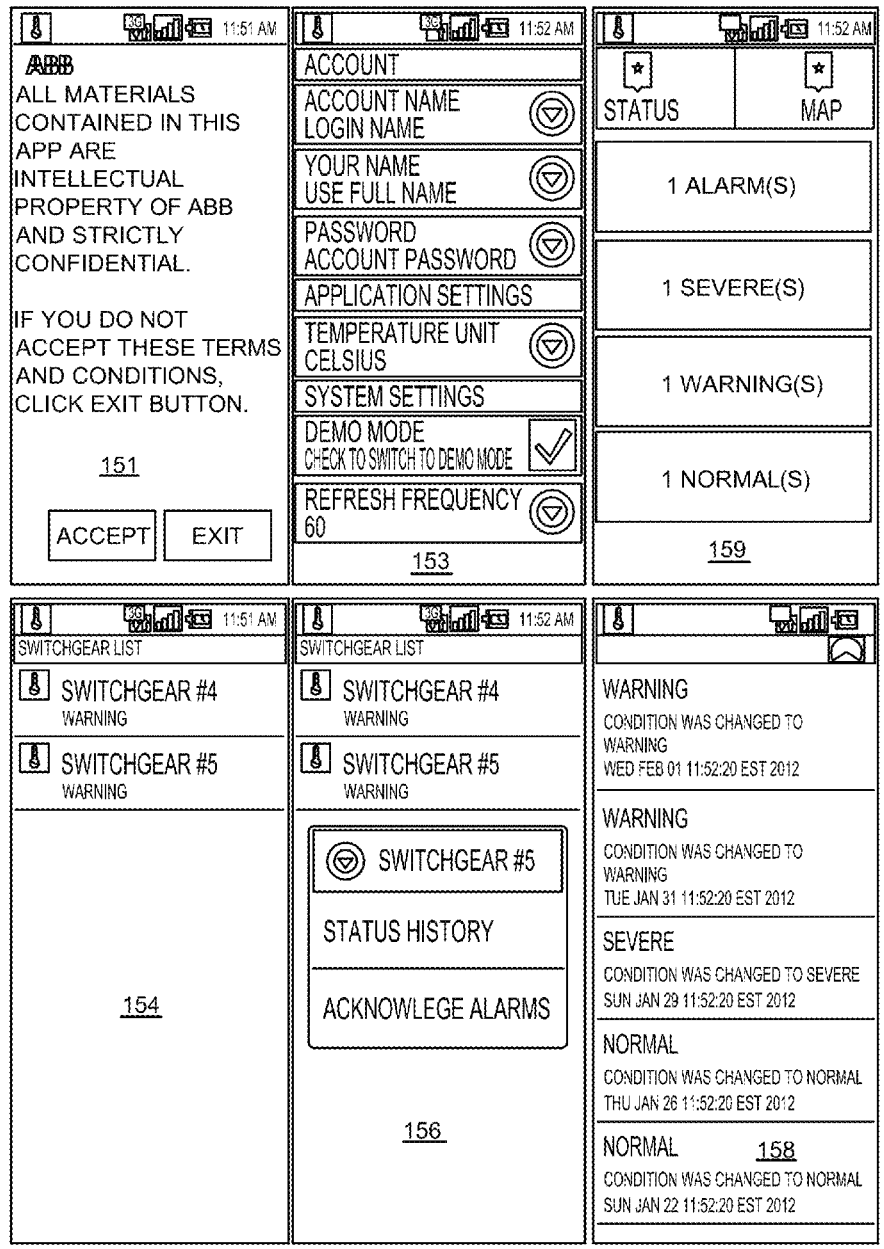
FIG. 30 shows an exemplary series of screens of the asset health computer application following the menu selections of an end user.

With reference now to FIG. 30, exemplary screens 151, 153, 154, 156, 158, 159 from the asset health computer application 100 are shown. Screen 151 requires the end user to accept terms and conditions for use of the computer application 100. If the end user accepts the terms, the end user may modify account settings in screen 153. The end user is able to store their logon and password in screen 153. Screen 153 allows the end user to set the desired temperature unit of measure, demo mode for testing the computer application 100 that also prevents the user from modifying the configuration or status of assets, and a refresh frequency for data received by the computer application 100.

With continued reference to FIG. 30, a status menu is available in screen 159 of the computer application 100. A grouping of assets by alarm status on the overall power system is available in screen 159. The end user may select one of the groups of alarm statuses such as the warning(s) option that shows "2 warnings" in the present example. Moving to screen 154, the end user has chosen the warning(s) option and the two warnings are associated with Switchgear #4 and Switchgear #5.

If the end user selects Switchgear #5 to view in more detail as shown in the detail view of screen 156, the options of status history 155 and acknowledge alarms 157 are available for selection. If the end user chooses the status history option 155, a time- and date-stamped listing of the status history for a predetermined duration is displayed on the mobile device 10 as shown in screen 158.

The status history of the exemplary Switchgear #5, as viewed in chronological order on page 158 from the bottom up begins with a normal status on Sunday, Jan. 22, 2012 at 11:52:20 EST. The condition is changed to normal status again on Thursday, Jan. 26, 2012 at 11:52:20 EST. On Sunday, Jan. 29, 2012, the condition is changed to a severe status at 11:52:20 EST. On Tuesday, Jan. 31, 2012, the condition is changed to a warning status at 11:52:20 EST. On Wednesday, Feb. 1, 2012, the condition is changed to a warning status at 11:52:20 EST.

The severe, warning, and normal statuses are determined by measured or calculated values received from the monitored asset(s) of interest. Preceding each status change described above are alarm events that are acknowledged using the acknowledge alarms selection 157 on screen 156 by the end user servicing Switchgear #5, for example. An acknowledgement of a severe or warning alarm in most cases will change the status of the monitored asset to warning or normal status, depending on the situation and the predefined thresholds for triggering the alarm statuses.

Figure 31:
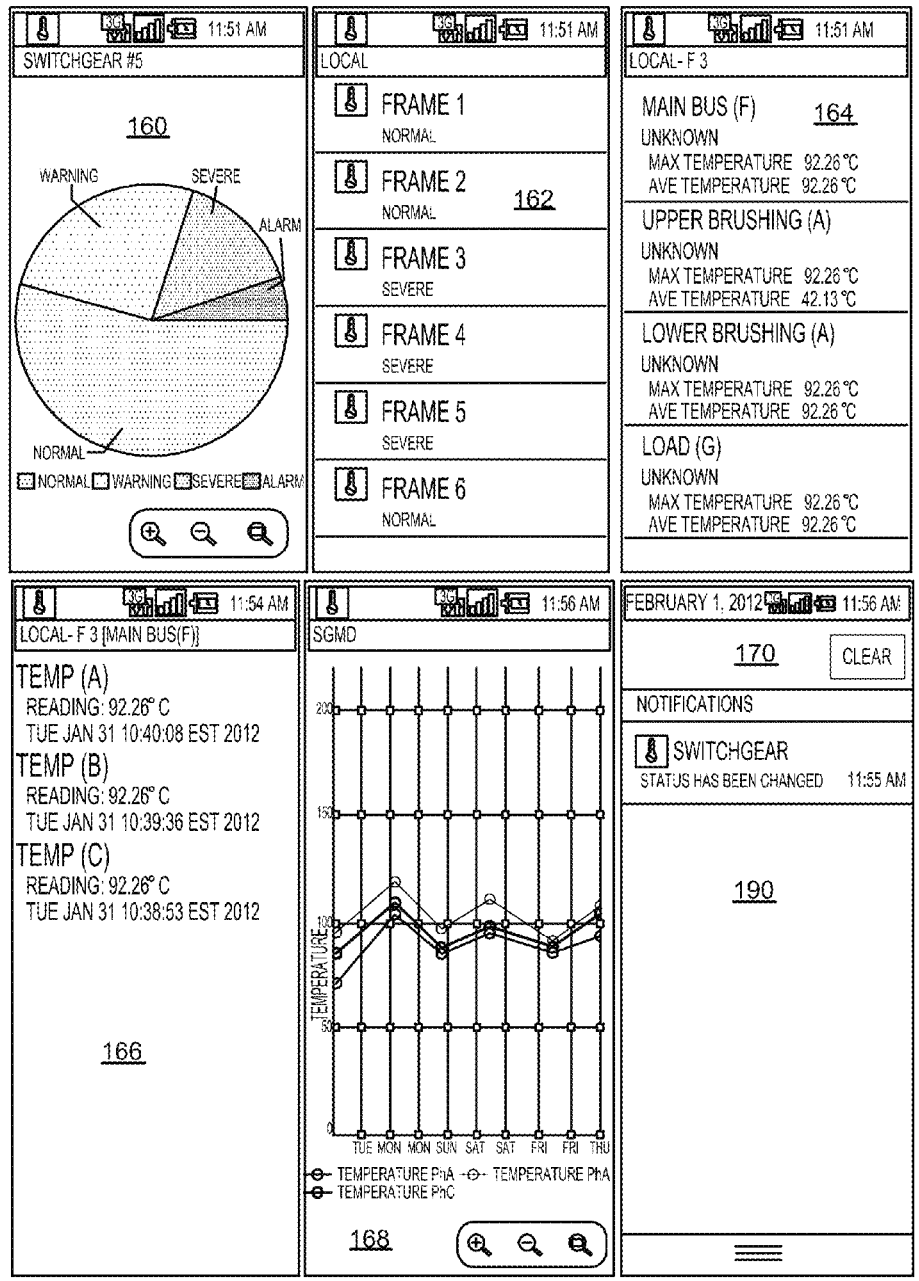
FIG. 31 shows detail and chart views of the selected asset for monitoring.

Referring now to FIG. 31, there are several screens of the asset health computer application 100 depicted. Screen 160 is a pie chart showing the proportion of the various statuses of the frames of exemplary Switchgear #5 over a predetermined period of time. It should be understood that charting functions are not limited to pie charts and that bar charts and various other charts are available in the computer application 100. Screen 162 shows the six frames of exemplary Switchgear #5 and the status for each frame. Frames 1, 2, and 6 are in normal operation and frames 3, 4, and 5 are exhibiting severe status. Screen 164 provides a drill down further into the components of Frame 3 which is exhibiting a severe status. The exemplary components of Frame 3 for which temperature values are shown are the main bus, upper bushing and lower bushing. The load temperature is also shown.

With continued reference to FIG. 31, a temperature reading and date- and time-stamp of the reading or record is shown for conductors A, B, and C of main bus (f) in Screen 166. Screen 166 is the result of drilling down into or selecting the main bus (f) option of screen 164. Another feature provided by the computer application 100 is the selection of a component (in the present example the selected component is the upper bushing option of screen 264) for charting historical and real-time values. The selected component and user-specified or predetermined duration is depicted in the graphical view of screen 168 which shows temperature values over the exemplary time span of a week.

Screen 170 of FIG. 31 is a view of a broadcast notification on an end user's mobile device 10 that the status of switchgear has been changed. Upon selecting or drilling into the notification, the end user may act on the notification by acknowledging an alarm or call up charts for the asset, or request driving directions to the asset of interest.

Figure 32:
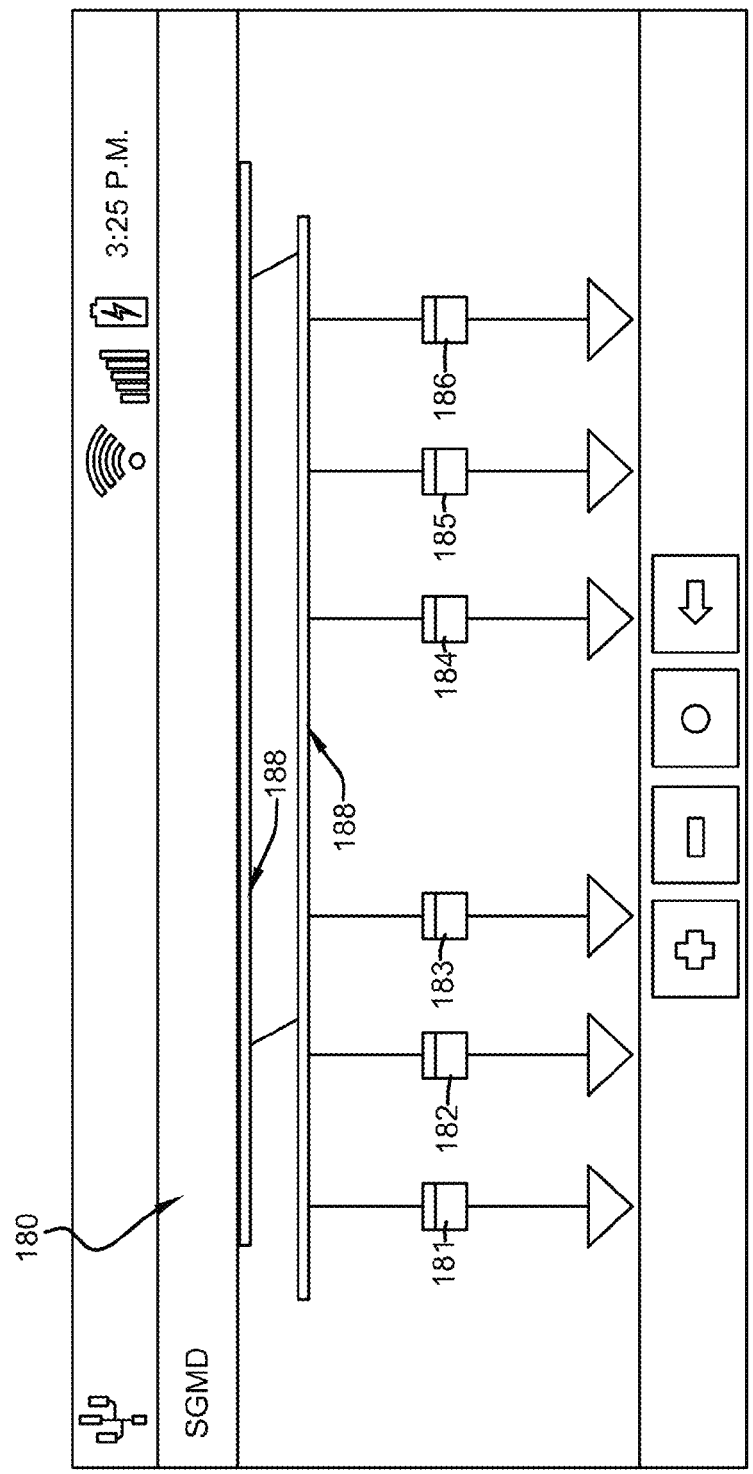
FIG. 32 is schematic of the components of the selected asset along with a color-coded alarm status of each component.

Referring now to FIG. 32, a schematic 180 of the six frames of exemplary switchgear #5 is displayed by the mobile device 10 when the user drills down by selecting any of the six frames of screen 162. Frames 1, 2, and 6 are operating under normal status 181, 182, 186 and are color-coded differently from the frames 3, 4, and 5 operating under severe status 183, 184, 185. Each of the frames are represented as boxes having horizontal lines therein that represent feeder lines to the exemplary Switchgear #5 and may also represent feeder lines to circuit breakers. The parallel lines 188 represent bus bars. The bus bars 188 are used to show the manner in which the frames 1, 2, 3, 4, 5, and 6 of the switchgear are connected.

While the present application illustrates various embodiments of a system and method for developing, deploying and implementing power system computer applications, and while these embodiments have been described in some detail, it is not the intention of the applicant to restrict or in any way limit the scope of the appended claims to such detail. Additional advantages and modifications will readily appear to those skilled in the art. Therefore, the invention, in its broader aspects, is not limited to the specific details, the representative embodiments, and illustrative examples shown and described. Accordingly, departures may be made from such details without departing from the spirit or scope of the applicant's general inventive concept.

The invention claimed is:

1. A framework for developing a computer application that allows an authorized end user to monitor operational status of a power system and update configuration settings in a device installed on said power system to effect a change in said power system operational status, said framework comprising: a set of modules combinable to build said computer application, each of said modules having an associated functionality selected from at least one of the following functions: security management, profile management, system configuration, device level views, event views, data access, background service, mapping/GIS, data service, and application programming interfaces, each of said modules combinable with another of said modules to develop said computer application for monitoring said operational status of said power system, said developed computer application for execution by a mobile device, said mobile device communicating said user-updated configuration settings to said power system device.

2. The framework of claim 1 wherein said mobile device comprises a smartphone, tablet or cell phone.

3. The framework of claim 1 wherein said computer application is a mobile application.

4. The framework of claim 1 wherein said computer application is developed by an end user.

5. The framework of claim 1 wherein each of said modules is configurable by an end user.

6. The computer application of claim 1 wherein data presentation of the status of the overall power system or device installed thereon is in the form of charts.

7. The computer application of claim 1 wherein said data presentation of the status of the overall power system and devices installed thereon is in the form of alarm notifications, said alarm notifications grouping devices by operational status.

8. The computer application of claim 7 wherein said alarm notifications are acknowledged in the computer application and the acknowledgement is communicated to a gateway server, said gateway server communicating the acknowledgement to the device.

9. The computer application of claim 1 wherein data presentation of the status of the overall power system or device installed thereon provides the user with a list of options for organizing the data.

10. The computer application of claim 1 wherein data characterizing the status of the overall power system or device installed thereon is comprised of real-time measurement values characterizing the operation of said device.

11. The computer application of claim 10 wherein said data characterizing the status of the overall power system or device installed thereon is comprised of historical measurement values characterizing the operation of said device.

12. The computer application of claim 1 wherein data characterizing the status of the overall power system or device installed thereon is comprised of calculated values that are calculated using real-time and historical measurement values as variables in power system modeling algorithms.

13. A computer-implemented method for effecting the operation of a sensor installed on a power distribution system, said method comprising:
   identifying the location on the power distribution system experiencing a fault and said sensor monitoring said location experiencing said fault;
   accessing operational data of said sensor using a mobile device in communication with a gateway server, said gateway server for collecting and storing data for the location on the power distribution system experiencing said fault, said operational data of said sensor accessed using an identification number representing said sensor;

communicating configuration changes for said sensor to said gateway server using said mobile device;

and updating said sensor configuration to maintain a present level of power factor on said power distribution system.

14. The computer application of claim 13 wherein said mobile device comprises a smartphone, tablet, or cell phone.

15. The computer application of claim 13 wherein said computer application is a mobile application.

16. The computer application of claim 13 wherein said gateway server pushes data to said mobile device at scheduled intervals.

17. The computer application of claim 13 wherein said mobile application determines the location of the power distribution system experiencing sub-optimal performance and driving directions from the determined mobile device location to said location experiencing sub-optimal performance.

18. A computer application stored on a non-transitory computer-readable medium, said computer application having computer-readable program code executed by a processor to modify control settings of a capacitor bank on the grid to change the reactive compensation system using modular, fixed or switched capacitor steps that automatically compensate an individual load or the network to maintain a preset level of power factor.

19. The computer application of claim 18 wherein said computer application is a mobile application.

* * * * *